(12) United States Patent  (10) Patent No.: US 8,310,704 B2
Imai                      (45) Date of Patent:     Nov. 13, 2012

(54) PRINT CONTROL MECHANISM FOR CONTROLLING PRINTING OF PRINT DATA ASSOCIATED WITH SHORT-RANGE WIRELESS TERMINAL

(75) Inventor: Takuya Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 685 days.

(21) Appl. No.: 12/503,917

(22) Filed: Jul. 16, 2009

(65) Prior Publication Data
US 2010/0020355 A1   Jan. 28, 2010

(30) Foreign Application Priority Data

Jul. 25, 2008 (JP) ................................. 2008-191753
May 11, 2009 (JP) ................................. 2009-114814

(51) Int. Cl.
G06F 15/00 (2006.01)
G06F 3/12  (2006.01)
G06K 1/00  (2006.01)

(52) U.S. Cl. ..................................... 358/1.15; 358/1.14
(58) Field of Classification Search .................. None
See application file for complete search history.

(56) References Cited

U.S. PATENT DOCUMENTS

| 2004/0190038 | A1* | 9/2004 | Shahindoust | 358/1.14 |
| 2005/0084113 | A1* | 4/2005 | Simpson et al. | 380/270 |
| 2005/0102518 | A1 | 5/2005 | Wada | |
| 2006/0139685 | A1* | 6/2006 | Hayashi | 358/1.15 |
| 2006/0174130 | A1 | 8/2006 | Noble | |
| 2007/0075990 | A1 | 4/2007 | Sahashi et al. | |
| 2007/0195364 | A1 | 8/2007 | Umehara et al. | |
| 2007/0198102 | A1 | 8/2007 | Umehara et al. | |
| 2007/0245014 | A1* | 10/2007 | Hibino et al. | 709/223 |
| 2008/0007767 | A1 | 1/2008 | Ishimaru | |

FOREIGN PATENT DOCUMENTS

| JP | 2003-92784 | 3/2003 |
| JP | 2006-350726 | 12/2006 |
| WO | WO2005/001671 A1 | 1/2005 |

OTHER PUBLICATIONS

Apr. 7, 2011 European search report in connection with counterpart European patent application No. 09 25 1842.

* cited by examiner

Primary Examiner — Douglas Tran
(74) Attorney, Agent, or Firm — Cooper & Dunham LLP

(57) ABSTRACT

An image forming apparatus implements a print restriction depending on the environment of the image forming apparatus, such as who is or is not near the image forming apparatus. The image forming apparatus communicates with a short-range wireless terminal for authenticating print data with reference to access right information in which document identifying information identifying the print data is associated with wireless terminal identifying information identifying the short-range wireless terminal. The image forming apparatus includes an acquiring unit for acquiring the wireless terminal identifying information from the short-range wireless terminal; a determining unit for determining whether the printing of the print data should be permitted or not based on the wireless terminal identifying information acquired by the acquiring unit and the access right information; and a control unit for controlling the printing of the print data depending on a result of the determination made by the determining unit.

20 Claims, 25 Drawing Sheets

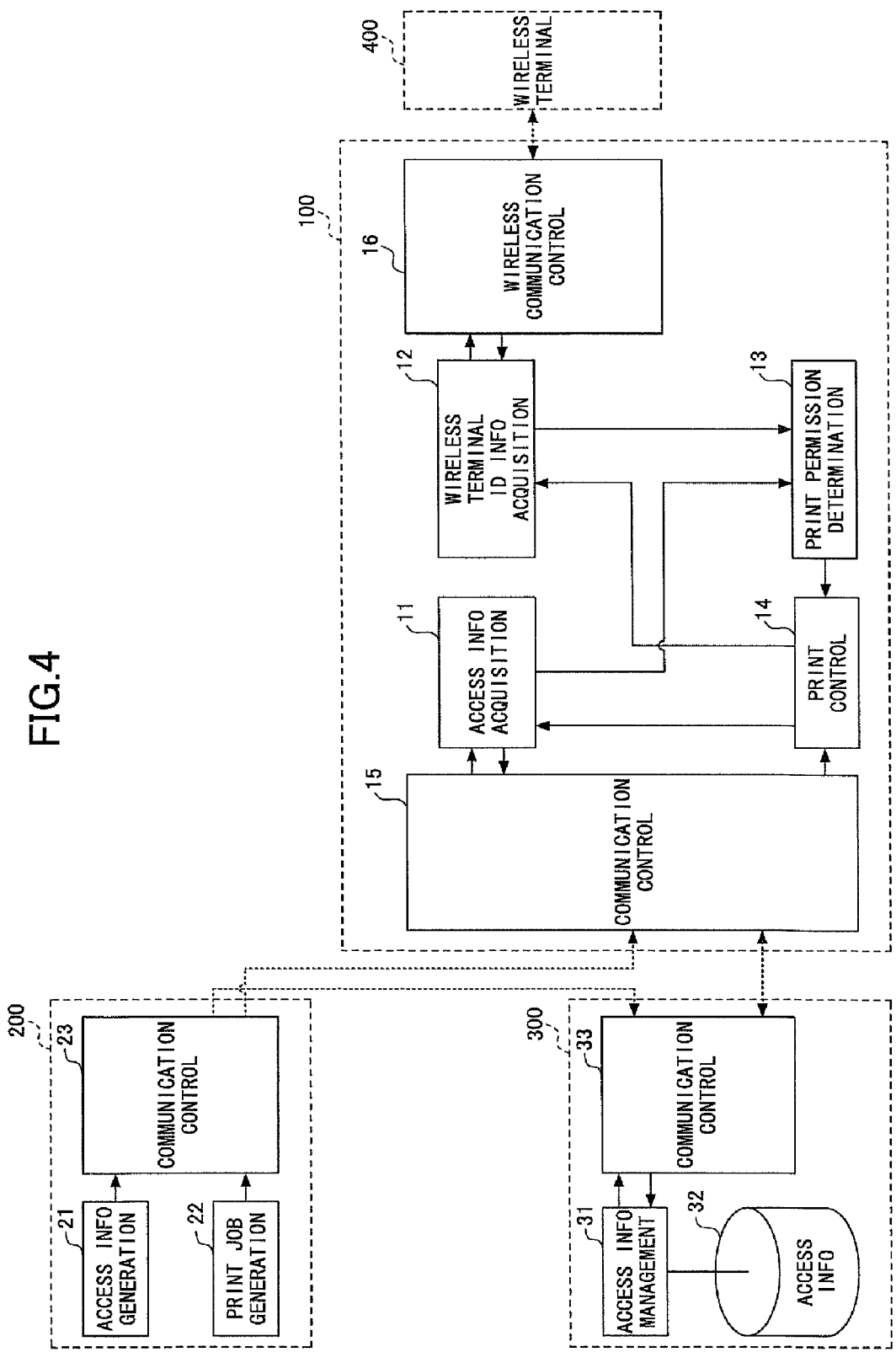

FIG.5A

SetAccessInfo, e860f4131a80448886e517cd455b805f, 87f3900ef0a0e2596145d8e1e2d8c78\n

- C1: SetAccessInfo,
- D1: e860f4131a80448886e517cd455b805f,
- A1: 87f3900ef0a0e2596145d8e1e2d8c78\n

| DOCUMENT ID (UUID) | WIRELESS TERMINAL ID (HASH VALUE OF BLUETOOTH ADDRESS) |
|---|---|
| e860f4131a80448886e517cd455b805f | 87f3900ef0a0e2596145d8e1e2d8c78 |
| 6e517cd455b805fe860f4131a8044888 | 6145d8e1e2d8c7887f3900ef0a0e259 |
| ...... | ...... |

| DOCUMENT ID (UUID) | CONDITION | CONDITION OPERATOR | WIRELESS TERMINAL ID (A) (HASH VALUE OF BLUETOOTH ADDRESS) | DISTANCE (DS) |
|---|---|---|---|---|
| e860f...805f | PRESENT | AND | 987f...8c78 | 3 |
| ...... | ...... | ...... | 62c2...e8fb | 3 |
| | | | ...... | ...... |

FIG.10

■ SETTING OF EXTENDED ACCESS INFO

■ WIRELESS TERMINAL FOR PRINT AUTHENTICATION
  (1) TERMINAL A  (2) TERMINAL B

■ SETTING OF CONDITIONS
  ● PERMIT PRINT IF CORRESPONDING WIRELESS TERMINAL IS PRESENT
  ○ PERMIT PRINT IF CORRESPONDING WIRELESS TERMINAL IS ABSENT
  ...

■ SETTING OF DISTANCE INFO
  (1) TERMINAL A :
  (2) TERMINAL B :

LEVEL
03 ▽
03 ▽
01
02
...

OK
CANCEL

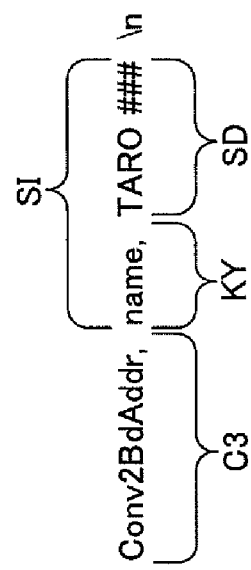
FIG.16A
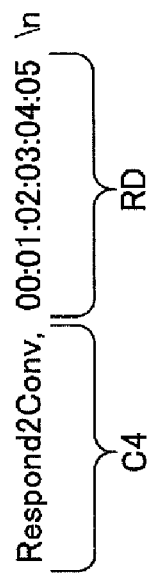
FIG.16B
FIG.16C

| EMPLOYEE ID | CONCERNED PARTY ID | | | 71 |
|---|---|---|---|---|
| | MANAGER | LEADER | SECTION | |
| ...... | ...... | ...... | ...... | |
| 123456789 | 2345678890 | 234567889a | GROUP A, B SECTION, C CENTER | |
| ...... | ...... | ...... | ...... | |
| 234567890 | — | — | B SECTION, C CENTER | |
| 234567889a | 234567890 | — | GROUP A, B SECTION, C CENTER | |
| ...... | ...... | ...... | ...... | |

PRINT CONTROL MECHANISM FOR CONTROLLING PRINTING OF PRINT DATA ASSOCIATED WITH SHORT-RANGE WIRELESS TERMINAL

BACKGROUND OF THE INVENTION

1. Field of the Invention

The present invention generally relates to a print control system in which one or more image forming apparatus are connected via a data transmission path. More particularly, the present invention relates to a technology for controlling a printing operation based on the environment in which the printing operation takes place.

2. Description of the Related Art

The rapid growth of information communications technologies, such as the Internet, has spawned problems associated with unauthorized access that can have an impact on a global scale. Such problems include tampering or destruction of data, identify theft or impersonation, leaking of classified information, and cyber terrorism.

In order to counter such problems, an access control method may utilize an access control list (ACL) referred to as Posix ACL according to the IEEE (Institute of Electrical and Electronics Engineers) 1003.1 standard. In another access control method, a device itself may be locked, just like a car or a desk drawer, so that the device cannot be used or turned on unless a matching key is inserted.

In recent years, a short-range wireless communication technology called Bluetooth has become increasingly common. Japanese Laid-Open Patent Application No. 2003-92784 proposes a technology for enabling a hard disk drive (HDD) to be shared by plural personal computers (PC) using Bluetooth in a local area network (LAN) environment while ensuring security. Japanese Laid-Open Patent Application No. 2005-176641 discloses a technology for preventing unauthorized access to a device or information (files) stored in the device using a connection authenticating technology based on the aforementioned short-range wireless communication standard.

However, these conventional methods have not been capable of sufficiently ensuring confidentiality of information printed by an image forming apparatus such as a printer. For example, when a user with access to certain information prints the information using a remote printer, a printed output could be seen by an unintended person, who may leak the printed information before the printed output can be in the hands of the user. In order to ensure the confidentiality of such printed information, it is desirable to limit the printing operation depending on who is present near the printer (i.e., printer environment).

SUMMARY OF THE INVENTION

The disadvantages of the related art are overcome by the present invention which, in one aspect, is an image forming apparatus for printing print data which is capable of communicating with a short-range wireless terminal for authenticating the print data with reference to access right information in which document identifying information identifying the print data is associated with wireless terminal identifying information identifying the short-range wireless terminal.

The image forming apparatus includes an acquiring unit configured to acquire the wireless terminal identifying information from the short-range wireless terminal; a determining unit configured to determine whether the printing of the print data should be permitted or not based on the wireless terminal identifying information acquired by the acquiring unit and the access right information; and a control unit configured to control the printing of the print data depending on a result of the determination made by the determining unit.

According to another aspect of the present invention, a print control system includes an image forming apparatus for printing print data; a short-range wireless terminal for authenticating the print data; and an information processing apparatus for managing access right information in which document identifying information identifying the print data is associated with wireless terminal identifying information identifying the short-range wireless terminal.

In this system, the image forming apparatus, the short-range wireless terminal, and the information processing apparatus are connected via a data transmission path. The information processing apparatus includes an information retaining unit configured to retain the access right information. The image forming apparatus includes a first acquiring unit configured to acquire the wireless terminal identifying information from the short-range wireless terminal; a second acquiring unit configured to send an information acquisition request to the information processing apparatus and configured to acquire the access right information from the information retaining unit; a determining unit configured to determine whether the printing of the print data should be permitted or not based on the wireless terminal identifying information acquired by the first acquiring unit and the access right information acquired by the second acquiring unit; and a control unit configured to control the printing of the print data in accordance with a result of the determination made by the determining unit.

According to another aspect of the present invention, a print control method for controlling printing of print data in a print control system includes an image forming apparatus for printing the print data, a short-range wireless terminal for authenticating the print data, and an information processing apparatus for managing access right information in which document identifying information identifying the print data is associated with wireless terminal identifying information identifying the short-range wireless terminal.

The image forming apparatus, the short-range wireless terminal, and the information processing apparatus are connected via a data transmission path. The method includes sending the wireless terminal identifying information from the short-range wireless terminal to the image forming apparatus via the data transmission path; sending the access right information from the information processing apparatus to the image forming apparatus via the data transmission path; determining whether the printing of the print data by the image forming apparatus should be permitted or not based on the wireless terminal identifying information sent from the short-range wireless terminal and the access right information sent from the information processing apparatus; and controlling the printing of the print data in accordance with a result of the determination made in the determining step.

BRIEF DESCRIPTION OF THE DRAWINGS

Other objects, features and advantages of the present invention will become apparent upon consideration of the specification and the appendant drawings, in which:

FIG. 4 shows a functional configuration of the print control system according to the first embodiment;

FIGS. 5A and 5B show an example of data in access right information according to the first embodiment;

FIG. 10 shows an extended access right information setting screen according to the second embodiment;

FIG. 16A shows an example of data in ID information according to the third embodiment;

FIG. 16B shows an example of transmission data in a request for wireless terminal identifying information from an ID management database;

FIG. 16C shows an example of transmission data in a response from the ID management database;

DETAILED DESCRIPTION OF THE PREFERRED EMBODIMENTS

Figure 1:
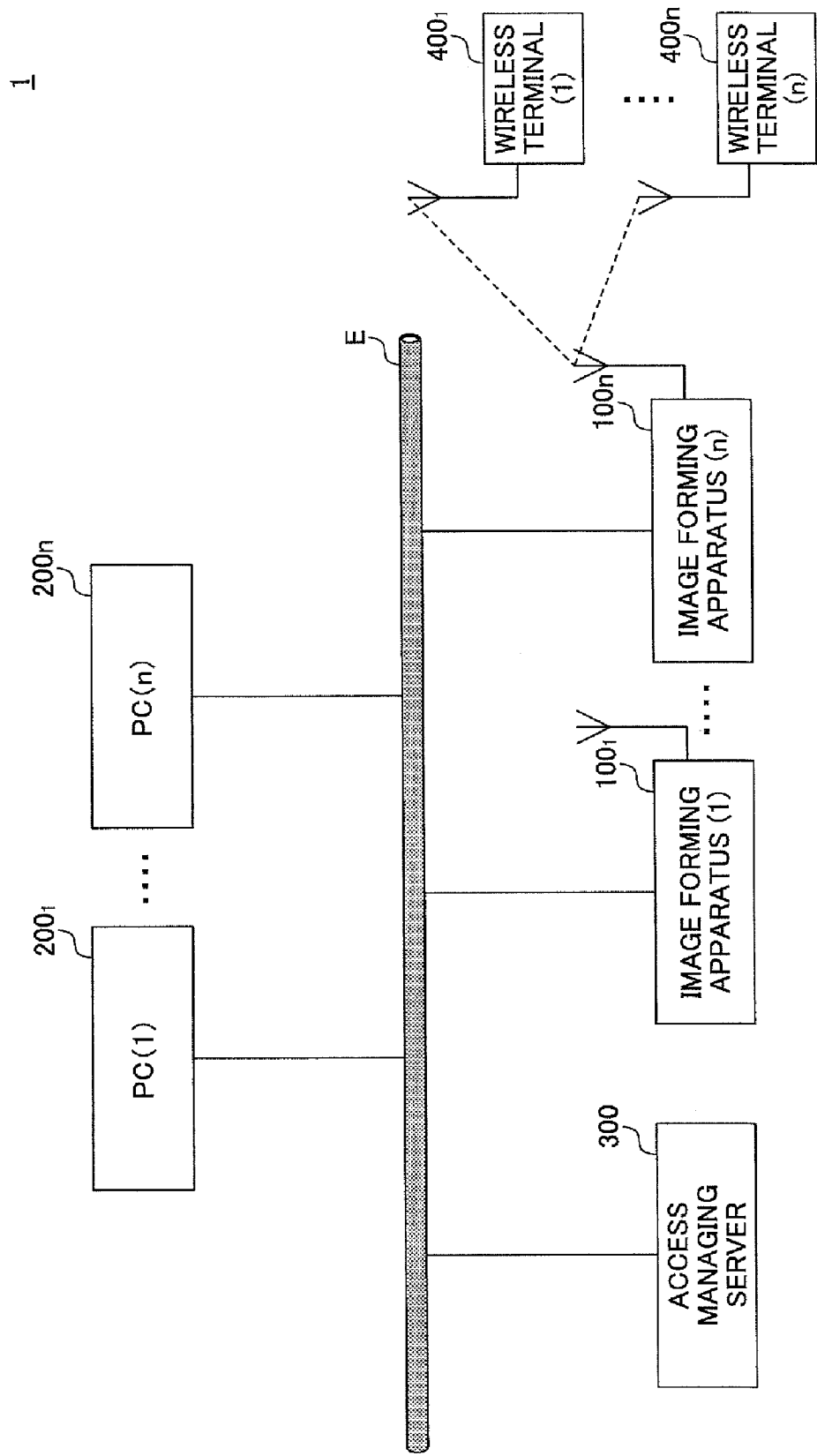
FIG. 1 shows a print control system according to a first embodiment of the present invention.

Hereafter, preferred embodiments of the present invention are described with reference to the drawings, wherein like reference numerals designate identical or corresponding parts throughout the several views.

Embodiment 1

<System Configuration>

FIG. 1 shows a configuration of a print control system 1 according to an embodiment of the present invention. The print control system 1 includes one or more image forming apparatus $100_1$ to $100_n$ (hereafter referred to as an "image forming apparatus 100"); one or more PCs (personal computers) $200_1$ to $200_n$ (hereafter referred to as "PC 200"); and an access right managing server 300. These units of the print control system 1 are connected via a data transmission path E.

The image forming apparatus 100 may include a laser printer or a multifunction peripheral (MFP). Each of the PC 200 and the access right managing server 300 may comprise a general-purpose information processing unit. The access right managing server 300 centrally manages access right concerning print data transmitted from the PC 200 to the image forming apparatus 100.

The image forming apparatus 100 is equipped with a short-range wireless communication device enabling communication with wireless terminals $400_1$ to $400_n$ (hereafter referred to as a "wireless terminal 400") located near the image forming apparatus 100.

The wireless terminal 400 may comprise a portable information terminal with a short-range wireless communication capability, such as a cellular phone or a PDA (personal digital assistant). In corporate environments, it is becoming increasingly common for employees to be issued with such portable information terminals as a business support tool, which may be used for schedule management, electronic mail transmission and reception, and viewing of data.

The present embodiment employs Bluetooth for the short-range wireless communication in a PAN (Personal Area Network), with a possible communication range on the order of several meters (i.e., limited within a proximate area). According to the Bluetooth technology, individual short-range wireless communication devices are allocated unique information (Bluetooth address), which enables the identification of each communication device.

The print control system 1 according to the present embodiment, when introduced in an office environment, may implement a following print control. When the PC 200 requests the image forming apparatus 100 in the print control system 1 to print, the image forming apparatus 100 first communicates with the wireless terminal 400 and identifies an employee carrying the wireless terminal 400 near the image forming apparatus 100. Then, the image forming apparatus 100 implements a print restriction based on the identity of the employee and in accordance with a corresponding access right managed in the managing server 300. In this way, a printing operation can be limited depending on the environment of the image forming apparatus 100.

<Hardware Configuration>

Figure 2:
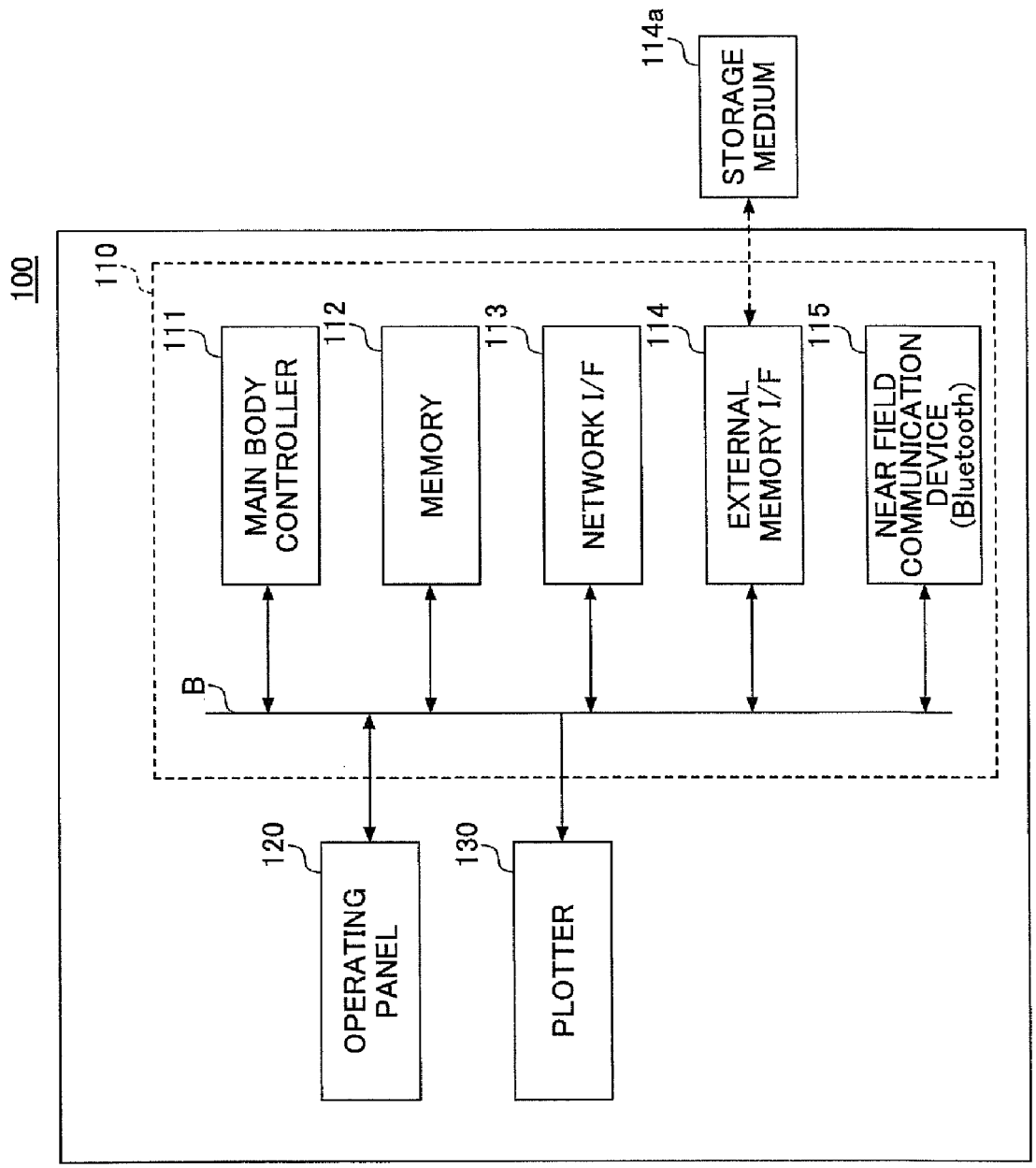
FIG. 2 shows a hardware configuration of an image forming apparatus according to the first embodiment.

FIG. 2 shows a hardware configuration of the image forming apparatus 100 according to the present embodiment. As shown in FIG. 2, the image forming apparatus 100 includes a controller 110, an operating panel 120, and a plotter 130, which are mutually connected via a bus B.

The operating panel 120 includes a display section and an input section for providing various information to a user and for receiving various user operations, such as the input of an operation setting or an operation instruction. The plotter 130 includes an image forming unit for forming an image on a recording medium such as a sheet of paper, using an electrophotography process or an inkjet process, for example. The controller 110 includes a main body control unit 111, a storage unit 112, a network interface (I/F) 113, an external storage I/F 114, and a short-range wireless communication device 115, which are connected via the bus B.

The main body control unit 111 may include a central processing unit (CPU) for realizing various functions or controlling the apparatus as a whole by executing a program. The storage unit 112 stores various information or data, such as the aforementioned program or image data. The storage unit 112 may include a RAM (random access memory) which is a volatile memory; a ROM (read only memory) which is a nonvolatile memory; and a large-capacity HDD. The RAM may provide a work area (where programs or data are temporarily loaded) for the main body control unit 111. The ROM and the HDD may be used as a storage for the program or various data. Thus, in the image forming apparatus 100, various functions may be realized by the main body control unit 111 reading the program stored in the ROM, loading it on the RAM, and executing the program.

The network I/F 113 provides an interface for connecting the image forming apparatus 100 to the data transmission path E in a network, for example. Thus, the image forming apparatus 100 can communicate with the PC 200 and the access right managing server 300 via the network I/F 113.

The external storage I/F 114 provides an interface for connection with a recording medium 114a as an external storage unit. The recording medium 114a may include an SD (secure digital) memory card or a USB (universal serial bus) memory. Programs or data stored in such external storage unit may be read by the image forming apparatus 100.

The short-range wireless communication device 115 provides an interface for communication (Bluetooth communication) with the wireless terminal 400 that is located nearby.

In the configuration of the image forming apparatus 100 shown in FIG. 2, print data received from the PC 200 may be converted into a raster image (bitmap image) in accordance with an image forming program run by the controller 110, and a resultant toner image may be formed by the plotter 130 on a recording sheet.

Hereafter, a hardware configuration of the PC 200 and the access right managing server 300 according to the present embodiment is described. Because both the PC 200 and the access right managing server 300 may comprise similar information processing units, as mentioned above, the following descriptions refer to the PC 200.

Figure 3:
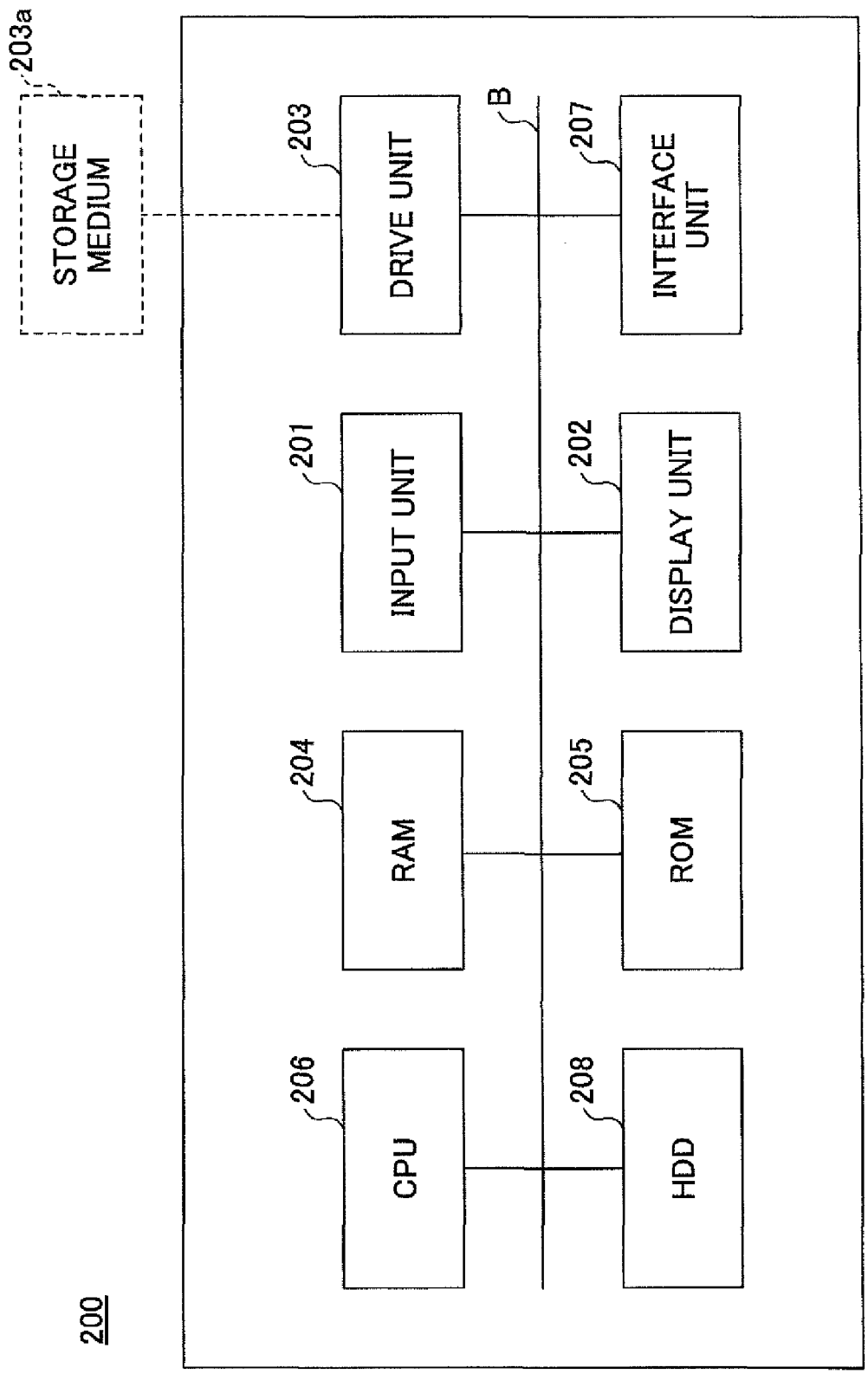
FIG. 3 shows a hardware configuration of an information processing unit according to the first embodiment.

FIG. 3 shows a hardware configuration of the information processing unit 200 according to the present embodiment. As shown in FIG. 3, the information processing unit 200 includes an input unit 201, a display unit 202, a drive unit 203, a RAM 204, a ROM 205, a CPU 206, an interface unit 207, and a HDD 208, which are connected via a bus B.

The input unit 201 may include a keyboard and mouse and is used for entering various operating signals into the information processing unit 200. The display unit 202 displays various information, such as a result of processing by the information processing unit 200 or print job information.

The interface unit 207 provides an interface for connecting the information processing unit 200 with the predetermined data transmission path E. Via the interface unit 207, the information processing unit 200 can communicate with the image forming apparatus 100 and the access right managing server 300.

The HDD 208 is a nonvolatile storage unit in which various programs or data may be stored. Such stored programs or data may include a Windows or UNIX operating system (OS) for controlling the information processing unit 200 as a whole, and various applications for providing various functions (such as a print request function) of the information processing system. The HDD 208 may manage the stored programs or data using a predetermined file system and/or a database.

The drive unit 203 provides an interface for connecting a detachable recording medium 203a, which may include a CD (compact disk) or a DVD (digital versatile disk), so that a program or data recorded in the recording medium 203a can be read by the information processing unit 200.

The ROM 205 is a nonvolatile semiconductor memory (storage unit) capable of retaining internal data even when power supply is turned off. The ROM 205 may store a BIOS (basic input/output system) that is executed when the information processing unit 200 is booted up, system settings of the information processing unit 200, and network-related settings. The RAM 204 is a volatile semiconductor memory (storage unit) for temporarily storing the programs or data read from the aforementioned various storage units. The programs may be executed by the CPU 206 to realize various functions or control the apparatus as a whole. For example, in the information processing unit 200, the CPU 206 reads a program stored in the ROM 205 or the HDD 208, loads it on the RAM 204, and executes it in order to realize a certain function.

In this configuration shown in FIG. 3, the information processing unit 200 may generate print data in accordance with a print data generating program (printer driver) run by the CPU 206, and transmit the print data to the image forming apparatus 100 via the interface unit 207, thus realizing a print request function.

<Print Control Function>

Hereafter, the print control function according to the present embodiment is described. Upon reception of a print request for printing print data, the image forming apparatus 100 starts communication with the wireless terminal 400 located nearby. The image forming apparatus 100 acquires wireless terminal identifying information from the wireless terminal 400, and determines whether the print request should be granted based on the wireless terminal identifying information and the access right information that is set for the print data, indicating whether printing of the print data by the wireless terminal 400 may be permitted. In this way, the image forming apparatus 100 can limit the printing operation depending on the environment of the image forming apparatus 100 that is detected through communication with the wireless terminal 400.

As mentioned above, in order to ensure confidentiality of printed information, a printing operation should desirably be limited depending on who is around the image forming apparatus 100 used for the printing operation. For example, the printing operation should be withheld when the person who has made a print request or someone designated by the person to receive a printed output is not around the image forming apparatus 100.

Thus, in accordance with the present embodiment, the image forming apparatus 100 communicates with the wireless terminal 400 to identify who is around the image forming apparatus 100, and determines whether a print request concerning print data should be granted based on an access right that is set for the print data in advance. Namely, the print data is authenticated ("print authentication") by referring to the wireless terminal 400 carried by an individual near the image forming apparatus.

The above print control function is described in greater detail in the following with reference to FIG. 4. FIG. 4 shows a functional configuration of the print control system 1 according to the present embodiment. The image forming apparatus 100 includes an access right information acquiring unit 11, a wireless terminal identifying information acquiring unit 12, a print permission determining unit 13, and a print control unit 14.

Before going into the description of the individual functional units, generation and management of access right information by the PC 200 and the access right managing server 300 is described with reference to FIGS. 5A and 5B. FIG. 5A shows an example of data (transmission data) in access right information 91 according to the present embodiment. The access right information 91 is generated in the PC 200 by the access right information generating unit 21.

The access right information generating unit 21 then transmits the access right information 91 to the access right managing server 300, thereby requesting the registration of the access right information 91.

The access right information generating unit 21 generates the aforementioned transmission data based on document identifying information (such as UUID: Universally Unique Identifier) that identifies a printed object such as document information, and wireless terminal identifying information (Bluetooth address) that identifies the wireless terminal 400. The document identifying information may be generated from a document (document file) designated via a predetermined tool and/or a browser. The wireless terminal identifying information may be entered via the predetermined tool and/or the browser.

Thus, the access right information generating unit 21 generates the transmission data in the access right information 91 by associating the document to be printed that is designated by the print requesting user with the wireless terminal 400 used for print authentication.

The transmission data mainly consists of a process request command and process target data. These include three items of data C1, D1, and A1. C1 designates a command requesting the registration of the access right information 91. D1 designates the generated document identifying information. A1 designates a hash value of the wireless terminal identifying information. The access right information generating unit 21, in order to enhance the confidentiality of authentication data, calculates the hash value of the wireless terminal identifying information using a predetermined hash function, such as MD5 (Message Digest 5), thus encrypting the wireless terminal identifying information.

On the other hand, management of the access right information 91 is handled by the access right managing server 300, using an access right information managing unit 31 and an access right information retaining unit 32. The access right information managing unit 31 manages the access right information 91 by performing various data operations on the access right information, such as registering, reading, or deleting data. For example, the access right information managing unit 31, in response to an access right information registration request from the PC 200, registers the access right information 91 by storing it in the access right information retaining unit 32. The access right information managing unit 31 determines a requested data operation from the process request command contained in the received data, and processes target data in the received data.

The access right information retaining unit 32 may store and retain the access right information 91 in a data structure shown in FIG. 5B. The access right information retaining unit 32 provides a nonvolatile storage unit (which may be an HDD) for the access right managing server 300.

In the access right information structure shown in FIG. 5B, the document identifying data and the wireless terminal identifying data are associated with one another, the latter of which is a hash value (encrypted wireless terminal identifying information). Based on the document identifying information, the access right information managing unit 31 can identify the wireless terminal 400 for print authentication.

The document identifying information and the hash value of the wireless terminal identifying information in the access right information 91 from the PC 200 are extracted by the access right information managing unit 31, and stored in the access right information retaining unit 32 as individual data items. Thus, in the access right managing server 300, the document to be printed and the wireless terminal 400 used for print authentication can be set in association with one another.

Although in the example of the access right information 91 shown in FIG. 5, the document identifying information and the hash value of the wireless terminal identifying information are associated on a one-to-one basis, this is merely an example. In another example, one item of document identifying information may be associated with the hash values of plural items of wireless terminal identifying information.

Thus, in the print control system 1 according to the present embodiment, the access right information 91 is generated and managed using the above-described functional units in the PC 200 and the access right managing server 300.

The individual functional units of the image forming apparatus 100 are described below. The access right information acquiring unit 11 is a functional unit for acquiring the access right information 91 managed by the access right managing server 300. The access right information acquiring unit 11 sends an information acquisition request to the access right managing server 300, and acquires the access right information 91 in a response therefrom.

The access right information acquiring unit 11 makes the acquisition request based on the document identifying information in the print request from the PC 200. Specifically, the access right information acquiring unit 11 transmits an information acquisition requesting command and the document identifying information to the access right information managing unit 31 of the access right managing server 300.

The access right information managing unit 31 identifies relevant data based on the document identifying information and sends it to the access right information acquiring unit 11 as a response from the access right managing server 300. Thus, the image forming apparatus 100, using the access right information acquiring unit 11, acquires the wireless terminal identifying information about the wireless terminal 400 used for print authentication that is associated with the print-requested document.

The wireless terminal identifying information acquiring unit 12 is a functional unit for acquiring the wireless terminal identifying information from the wireless terminal 400 located near the image forming apparatus 100. Specifically, the wireless terminal identifying information acquiring unit 12 issues a predetermined command to initiate a search for connection with the wireless terminal 400 ("Inquiry"). The wireless terminal identifying information acquiring unit 12 then acquires the wireless terminal identifying information from the wireless terminals 400 located nearby ("Inquiry Result").

The print permission determining unit 13 is a functional unit for determining whether a print request should be granted based on the wireless terminal identifying information acquired by the wireless terminal identifying information acquiring unit 12 from the wireless terminal 400 ("detected wireless terminal identifying information"), and the wireless terminal identifying information extracted by the access right information acquiring unit 11 from the access right information 91 ("stored wireless terminal identifying information"). Namely, the print permission determining unit 13 conducts print authentication by comparing the detected wireless terminal identifying information with the stored wireless terminal identifying information.

As mentioned above, the value of the stored wireless terminal identifying information according to in the access right information 91 is a hash value. Therefore, the print permission determining unit 13 calculates a hash value of the detected wireless terminal identifying information, using the same hash function. The print permission determining unit 13 then compares the calculated hash value with the hash value of the stored wireless terminal identifying information.

For example, if a document to be printed is associated in the access right information 91 with the wireless terminal 400 that is permitted to print the document, the print permission determining unit 13 determines that the printing of the document should be permitted when the compared values are the same. If the compared values are different, the print permission determining unit 13 determines that the document should not be printed. Conversely, if the document to be printed is associated in the access right information 91 with the wireless terminal 400 that is not permitted to print the document, opposite determinations are given.

The print control unit 14 is a functional unit for controlling a print operation by carrying out or cancelling a print job depending on the print permission determination result provided by the print permission determining unit 13. When a print request is made by the PC 200, a print job is generated by a print job generating unit 22 and transmitted to the image forming apparatus 100. The print job transmitted (upon print request) from the PC 200 is held by the print control unit 14 in the image forming apparatus 100, which then implements a print control in accordance with the print permission determination result from the print permission determining unit 13.

Also, the print control unit 14, upon receiving the print request and holding of the print job, sends an operation request to the access right information acquiring unit 11 and the wireless terminal identifying information acquiring unit 12 in order to acquire a result of determination made by the print permission determining unit 13.

The communications (transmission and reception of various information) between the individual units in the print control system 1 as described above are conducted via communication control units 15, 23, and 33 of the individual units. The communications between the image forming apparatus 100 and the wireless terminal 400 are conducted via a wireless communication control unit 16 of the image forming apparatus 100. Thus, in accordance with the present embodiment, the print control function is realized by the cooperation of the individual functional units as described above.

In the following, the print control function is described in greater detail (with regard to the cooperation of the individual functional units). In the following description, first an operation of the print control system 1 is described and then an operation of each of the PC 200 and the image forming apparatus 100 in the print control system 1 is described.

A function of the print control system 1 may be realized by the CPU of the image forming apparatus 100, the PC 200, or the access right managing server 300 reading an installed program (software component) (in ROM or HDD, for example) onto RAM, thereby performing processes as described below.

<System Operation>

Figure 6:
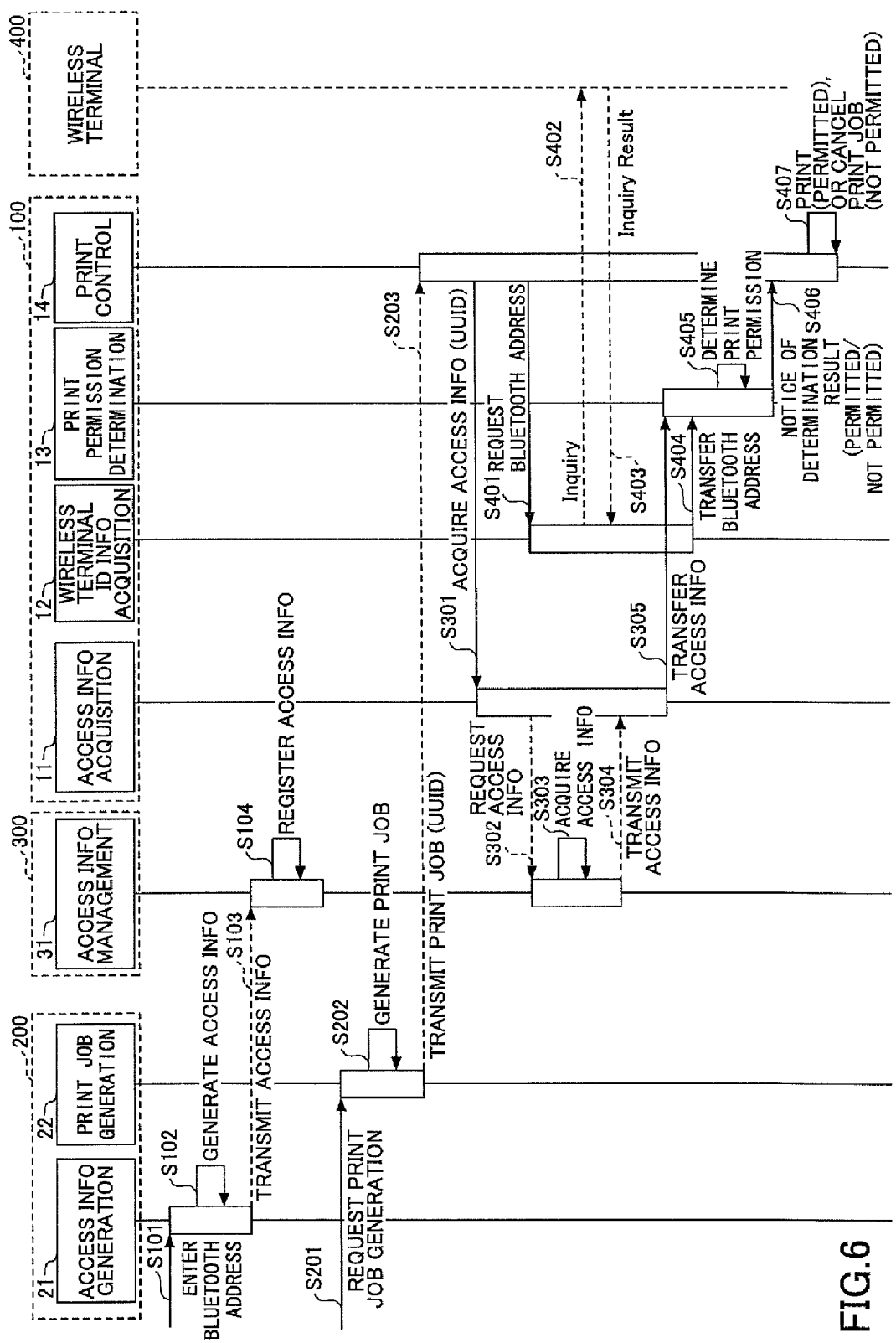
FIG. 6 shows a sequence diagram of a print control process according to the first embodiment.

FIG. 6 shows a sequence diagram of a print control process according to the present embodiment. As shown in FIG. 6, in the print control system 1, a document to be printed is designated and the Bluetooth address of the wireless terminal 400 for print authentication is designated via the PC 200 (step S101).

Based on the document information about the designated document and the Bluetooth address of the wireless terminal 400, the PC 200 generates the access right information 91 (transmission data) for a registration request, using the access right information generating unit 21 (step S102). The details of the process sequence in step S102 will be described later with reference to FIG. 7.

The access right information generating unit 21 transmits the generated access right information 91 to the access right managing server 300 (step S103), thus making an access right registration request.

In accordance with the registration request, the access right information managing unit 31 in the access right managing server 300 stores the document identifying information in the access right information retaining unit 32 in association with the wireless terminal identifying information, based on the received access right information 91, thereby registering the access right information 91 (step S104).

Thus, in the print control system 1, the setting of the access right information 91, in which the document to be printed and the wireless terminal 400 for print authentication are associated with one another, is completed.

Thereafter, in the print control system 1, a print job generating request is received from a document editing software application, for example, via the PC 200 (step S201).

In accordance with the print job generating request, the PC 200 converts, using the print job generating unit 22, the document information into print data that can be processed by the designated image forming apparatus 100, thus generating a print job (step S202).

The print job generating unit 22 then transmits the generated print job (print data) to the image forming apparatus 100 (step S203), together with its UUID as document identifying information. The UUID may be included in the print job.

Thus, in the print control system 1, the sending of the print request from the PC 200 to the image forming apparatus 100 is completed.

The image forming apparatus 100 then retains the received print data using the print control unit 14, and requests from the access right information acquiring unit 11 the access right information 91 that has been set (step S301). Specifically, the print control unit 14 delivers the received UUID to the access right information acquiring unit 11.

In response to the acquisition request, the access right information acquiring unit 11 requests from the access right managing server 300 the access right information 91 about the document to be printed (step S302) by sending the UUID to the access right managing server 300.

In response to the acquisition request, the access right managing server 300 acquires the access right information 91 about the document to be printed, using the access right information managing unit 31 (step S303). Specifically, the access right information managing unit 31 acquires the relevant access right information 91 by referring to the access right information retaining unit 32 based on the received UUID.

The access right information managing unit 31 transmits the acquired access right information 91 to the image forming apparatus 100 in response to the acquisition request therefrom (step S304).

The image forming apparatus 100 then delivers the access right information 91 that has been acquired using the access right information acquiring unit 11 to the print permission determining unit 13 (step S305).

The image forming apparatus 100 also requests, via the print control unit 14, the wireless terminal identifying information acquiring unit 12 to acquire the Bluetooth address of the wireless terminal 400 located nearby (step S401).

In accordance with the acquisition request, the wireless terminal identifying information acquiring unit 12 conducts a search for connection with the wireless terminal 400 via "Inquiry" (step S402), and acquires the Bluetooth address (step S403) from the wireless terminal 400 via "Inquiry Result".

The wireless terminal identifying information acquiring unit 12 then delivers the acquired Bluetooth address to the print permission determining unit 13 (step S404).

The print permission determining unit 13, based on the access right information 91 received in step S305 and the Bluetooth address received in step S404, makes a determination concerning print permission (step S405). The detailed process sequence in step S405 will be described later with reference to FIG. B.

The print permission determining unit 13 delivers a print permission determination result (either "permitted" or "not permitted") to the print control unit 14 (step S406).

The print control unit 14 then exerts a print control on the retained print job in accordance with the print permission determination result (step S407). Specifically, the print control unit 14 permits the printing of the print data when the print permission determination result is "Permitted". When the print permission determination result is "Not permitted", the print control unit 14 cancels the print job (i.e., deletes the retained print data). When the print permission determination result is "Not permitted", the print control unit 14 may store the retained print data in a HDD in the image forming apparatus 100, in addition to cancelling the print job.

Information about the thus print-controlled result is transmitted from the image forming apparatus 100 to the PC 200 that has made the print request, and the user is notified.

Thus, in the print control system 1, print authentication is performed using the wireless terminal 400 located near the image forming apparatus 100, so that a print restriction can be implemented depending on the environment of the image forming apparatus 100.

While in the foregoing process sequence the setting of access right in steps S101 to S104 and the print authentication process in steps S201 to S407 are performed at different times, this is merely an example. In another example, the setting of access right may be performed at the same time with a print request in the process sequence.

<Operation of PC>

Figure 7:
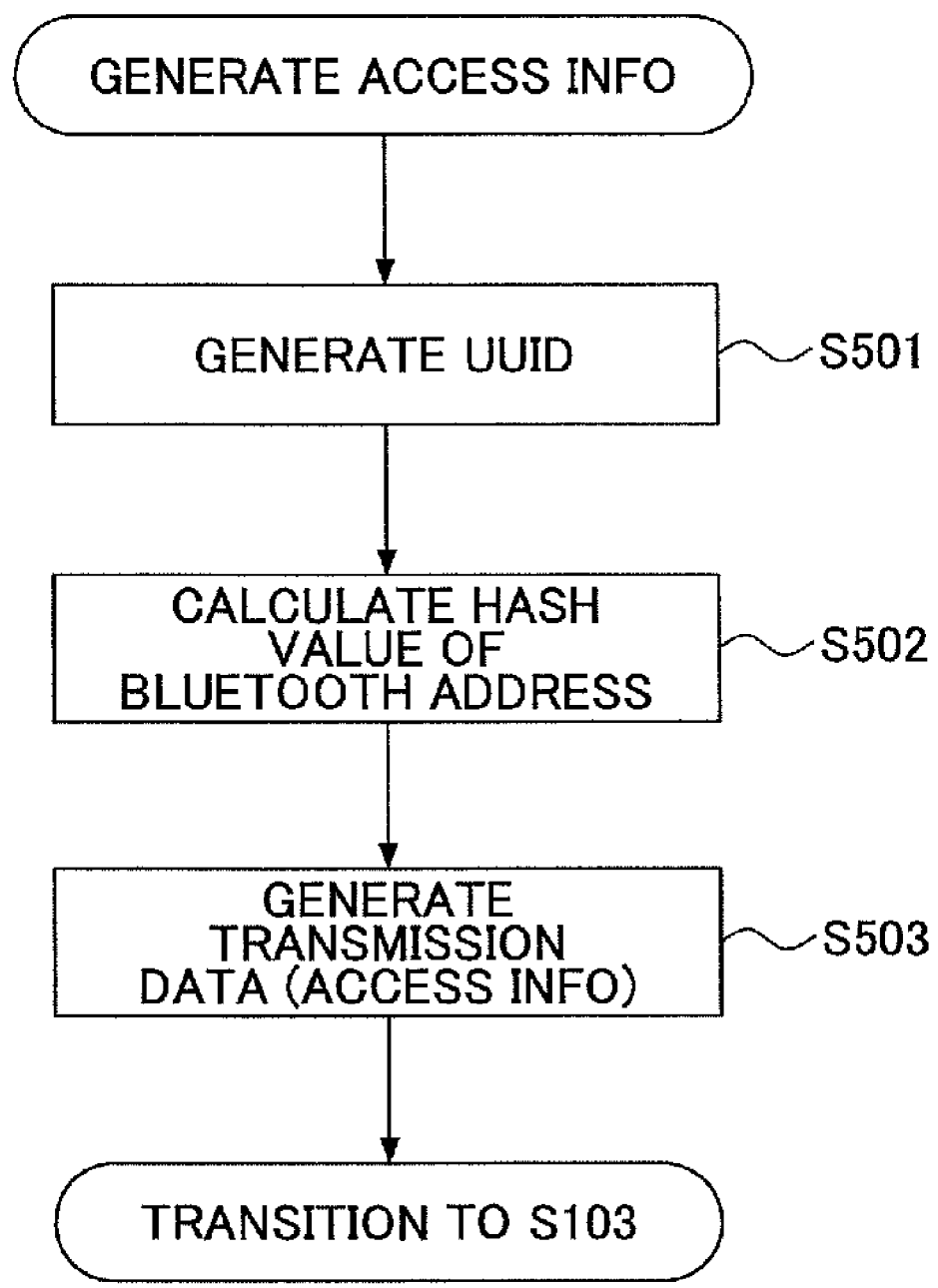
FIG. 7 shows a flowchart of a process sequence for generating the access right information according to the first embodiment.

FIG. 7 shows a flowchart of a process sequence for generating the access right information 91 according to the present embodiment. The process sequence shown in FIG. 7 mainly involves the details of step S102 shown in FIG. 6 performed by the access right information generating unit 21.

As shown in FIG. 7, the access right information generating unit 21 generates the UUID from the document information about the document designated in the above-described step S101 (step S501). The access right information generating unit 21 thus generates the document identifying information (UUID).

Thereafter, the access right information generating unit 21 calculates a hash value of the Bluetooth address entered in step S101, using a predetermined hash function (step S502). The access right information generating unit 21 thus encrypts the wireless terminal identifying information.

The access right information generating unit 21 attaches the generated UUID (document identifying information) and the calculated hash value (encrypted wireless terminal identifying information) as data concerning the registration target data, to a registration request command, thus generating the transmission data (access right information 91) that is transmitted upon registration request (step S503).

<Operation of Image Forming Apparatus>

Figure 8:
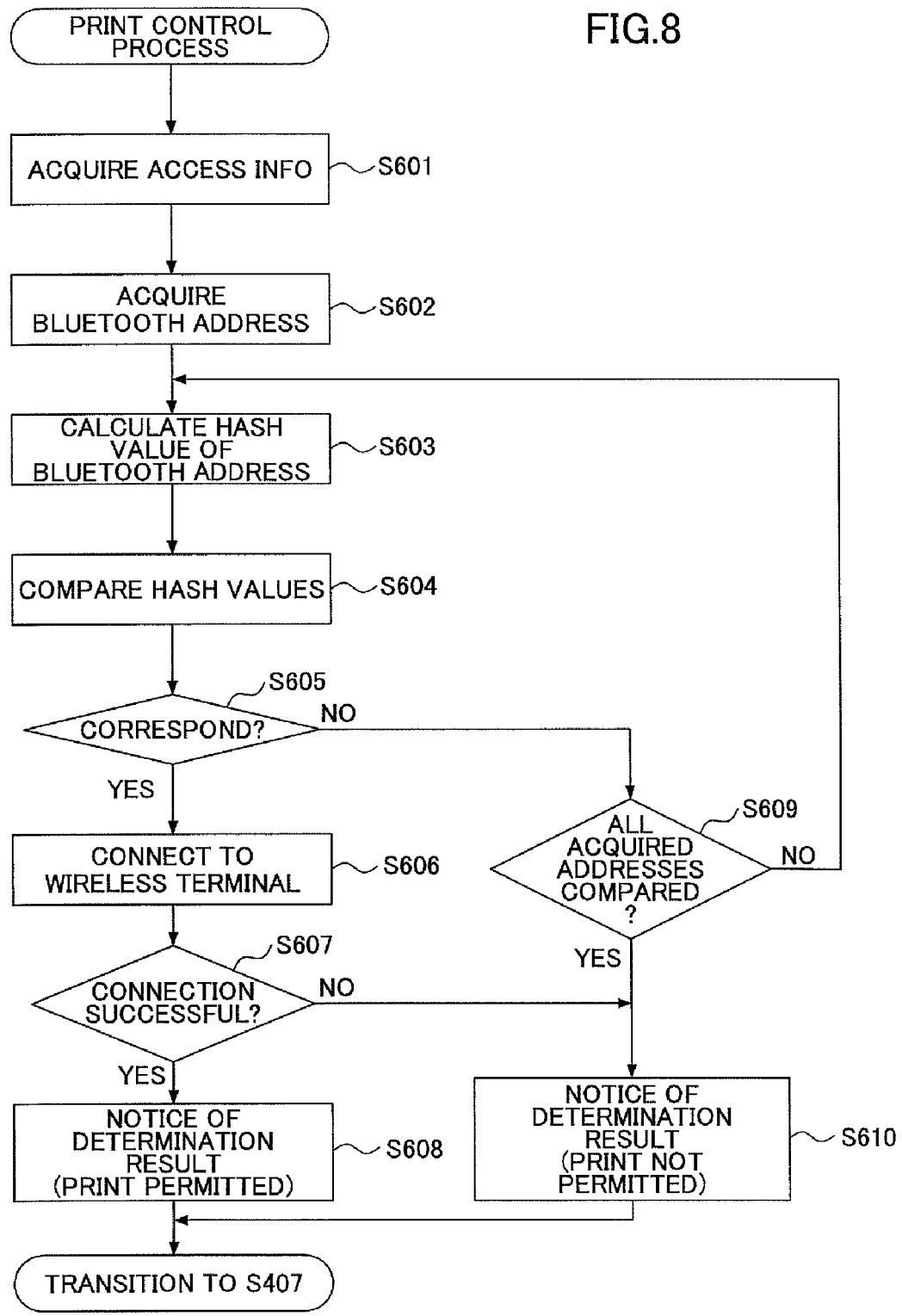
FIG. 8 shows a flowchart of a print restriction process according to the first embodiment.

FIG. 8 shows a flowchart of a process sequence for print control according to the present embodiment. The process sequence shown in FIG. 8 mainly involves the details of step S405 of FIG. 6 that is performed by the print permission determining unit 13.

As shown in FIG. 8, the access right information acquiring unit 11 acquires the access right information 91 from the access right managing server 300 (step S601). The process in step S601 corresponds to the process in above-described steps S301 to S305.

Thereafter, the wireless terminal identifying information acquiring unit 12 acquires the Bluetooth address from the wireless terminal 400 located near the image forming apparatus 100 (step S602). The process in step S602 corresponds to the process in the above-described steps S401 to 404.

The print permission determining unit 13 then calculates a hash value of the Bluetooth address acquired in step S602, using the hash function with which the access right information generating unit 21 encrypted the wireless terminal identifying information (step S603). When there are more than one Bluetooth address acquired, the print permission determining unit 13 calculates the hash values for all of the addresses.

The print permission determining unit 13 then compares the calculated hash value with the hash value of the wireless terminal identifying information included in the access right information 91 acquired in step S601 (step S604).

When the hash values are the same (YES in step S605), the print permission determining unit 13 may attempt to connect with the relevant wireless terminal 400 via the wireless communication control unit 16 (step S606). Specifically, the wireless communication control unit 16 may perform a pairing process in which two communication-enabled Bluetooth devices are paired by storing a link key in both devices. Thus, the pairing process pairs the relevant wireless terminal 400 with the image forming apparatus 100.

The link key is a unique access code that is automatically generated during the pairing process from a pass key, Bluetooth address, or an internally generated random number, for example. The pass key, which may be referred to as a personal identification number or "PIN" code, is an up to 16-digit string of English characters and numerals. The wireless terminal 400 that is requested to be paired with the image forming apparatus 100 in step S606 demands the entry of a pass key from a user, depending on optional device settings, whereby user authentication can be performed. In this way, any ill-intentioned third party who has come into possession of the wireless terminal 400 for print authentication through loss or theft can be prevented from using the wireless terminal 400 for malicious purposes.

When the connection with the wireless terminal 400 is successful (YES in step S607), the print permission determining unit 13 notifies the print control unit 14 of the print permission determination result "Permitted" (step S608).

On the other hand, if the connection with the wireless terminal 400 is unsuccessful (NO in step S607), the print permission determining unit 13 notifies the print control unit 14 of the print permission determination result "Not permitted" (step S610).

If the values compared in step S604 are different (NO in step S605), the print permission determining unit 13 determines whether all of the addresses acquired in step S602 have been compared (step S609).

If not all of the acquired addresses have been compared (NO in step S609), the print permission determining unit 13 repeats the process of comparing the hash value of the Bluetooth address with the hash value of the wireless terminal identifying information contained in the access right information 91.

On the other hand, if all of the acquired addresses have been compared (YES in step S609), the print permission determining unit 13, assuming that there is no more wireless terminal 400 for print authentication near the image forming apparatus 100, notifies the print control unit 14 of the print permission determination result "Not permitted" (step S610).

<Summary>

Thus, in accordance with Embodiment 1, the image forming apparatus 100 communicates with the wireless terminals 400 to identify who is near the image forming apparatus 100 (thus detecting the environment). The image forming apparatus 100 then determines whether printing of print data should be permitted or not depending on the confirmed environment, in accordance with an access right that is set for the print data in advance. Thus, the image forming apparatus 100 performs print authentication using the wireless terminal 400 that is carried by the individual near the image forming apparatus 100, such as an employee in an office environment. In this way, the image forming apparatus 100 according to the present embodiment can implement print restrictions based on the environment of the image forming apparatus.

Embodiment 2

In a typical modern office environment, persons who are admitted into a particular room or area may include not only regular employees but also people under contract (such as temporary employees). In such an environment, it is desirable to perform the print permission determination based on multiple individuals, in order to ensure the confidentiality of information to be printed. For example, when there is a temporary employee near the image forming apparatus, the image forming apparatus is controlled not to print. Or when an immediate manager of a person who makes a print request or an intended recipient (such as someone in charge of information management) is not near the image forming apparatus, the image forming apparatus is controlled not to print.

Thus, in accordance with the present embodiment, the image forming apparatus has a print control function that makes a print permission determination (print authentication) based on an extended access right. The print control function according to the present embodiment is described in the following, in which technical elements or aspects similar to those of Embodiment 1 are designated with similar reference signs and their description is omitted.

<Print Control Function>

Figures 9A, 9B:
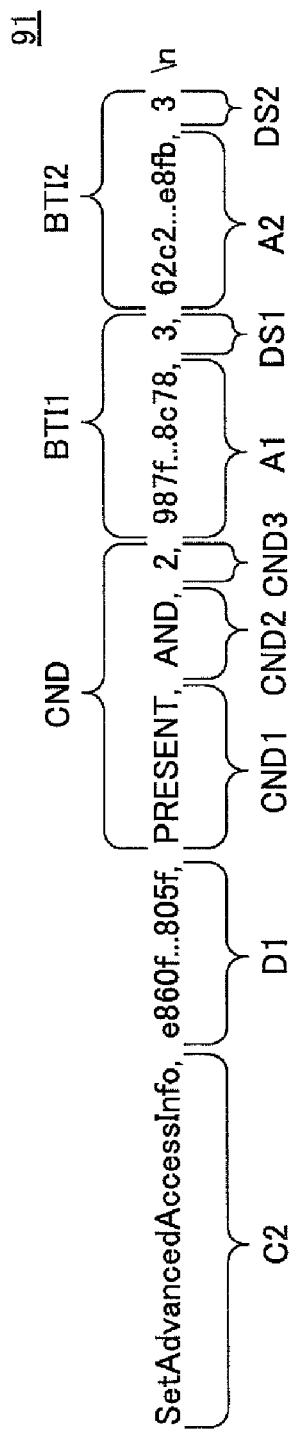
FIG. 9A shows an example of data in access right information according to a second embodiment of the present invention.
FIG. 9B shows a format in which the access right information is stored.

Referring to FIGS. 9A and 9B, generation and management of access right information 91 by the PC 200 and the access right managing server 300 in the print control system 1 according to Embodiment 2 is described.

FIG. 9A shows an example of data in the access right information 91 according to the present embodiment. The access right information generating unit 21 of the PC 200 may generate the transmission data shown in FIG. 9A as the access right information 91, which is transmitted to the access right managing server 300, thereby requesting the registration of the access right information 91.

The aforementioned transmission data is generated based on document identifying information and wireless terminal identifying information. Further, the access right information 91 includes various other conditions (hereafter referred to as "extended conditions") for print authentication based on the wireless terminal identifying information. The extended conditions may be set on a screen shown in FIG. 10.

FIG. 10 shows an example of the screen for setting the access right information 91 according to the present embodiment, which includes the extended conditions. As shown in FIG. 10, the extended conditions that can be set may include a permitting condition that relates the presence or absence of the wireless terminal 400 to a print permitting determination, and a communication distance condition that relates a communication distance between the image forming apparatus 100 and the wireless terminal 400 with a print permitting determination. In the screen example shown in FIG. 10, the presence/absence condition can be set by selecting a radio button, while the communication distance condition can be set by selecting from a pull-down menu.

Thus, the access right information generating unit 21 generates the transmission data by associating the document to be printed that is designated by a user who makes a print request, the wireless terminal 400 for print authentication, and the extended conditions for print authentication to each other.

The transmission data mainly consists of a process request command, extended condition data, and process target data. Specifically, the transmission data shown in FIG. 9A includes four items of data C2, D1, CND, and BTI. C2 indicates a command for requesting the registration of the access right information 91. D1 indicates generated document identifying information. CND designates extended conditions for print authentication. BTI (BTI1 and BTI2) designates information about the wireless terminal 400 (hereafter referred to as "wireless terminal information").

The extended conditions in the transmission data shown in FIG. 9A includes three condition data items CND1, CND2, and CND3. CND1 indicates the print permitting condition "PRESENT" or "ABSENT" specifying that a print permission is given when the wireless terminal 400 for print authentication is present or absent, respectively. CND2 indicates a condition operator "AND" or "OR" specifying whether print authentication should be conducted with respect to all or one of a plurality of the wireless terminals 400 that are designated for print authentication. CND3 indicates a number 1 to 16 of the wireless terminals 400 that are designated for print authentication.

In the wireless terminal information BTI, information can be set for individual wireless terminals. The transmission data shown in FIG. 9A includes two process target data items A (A1 and A2) and DS (DS1 and DS2). The process target data A indicates a hash value of wireless terminal identifying information (encrypted wireless terminal identifying information). The process target data DS indicates a condition concerning a communication distance between the image forming apparatus 100 and the wireless terminal 400. The transmission data shown in FIG. 9A contains wireless terminal information about two wireless terminals 400.

Thus, in the print control system 1 according to the present embodiment, an access right is set by a combination of the above extended conditions for one or more wireless terminals 400 for print authentication, whereby multi-conditional print authentication (authentication based on plural conditions) can be performed. As a result, the confidentiality of printed information can be increased. For example, in the case of the transmission data shown in FIG. 9A, the access right is set such that printing is not permitted unless the two wireless terminals 400 are present at the communication distance of level 3 or less from the image forming apparatus 100.

On the other hand, management of the access right information 91 is handled by the access right managing server 300. In the access right managing server 300, the access right information managing unit 31 manages the access right information 91 by performing various data operations, such as registration, reading, or deletion of data. For example, upon reception of a registration request for the extended access right information from the PC 200, the access right information managing unit 31 registers the access right information 91 by storing it in the access right information retaining unit 32 of the access right managing server 300.

The access right information retaining unit 32 may store and retain the access right information 91 including the extended conditions in a data structure shown in FIG. 9B. The access right information structure shown in FIG. 9B includes the various extended condition items, in addition to the document identifier and the wireless terminal identifier, where the document identifying information, hash values of the wireless terminal identifying information, and the extended conditions for print authentication are associated with one another. Thus, the access right information managing unit 31 can identify, based on the document identifying information, the wireless terminal 400 for print authentication and the extended conditions that have been set for the wireless terminal 400 for print authentication.

The document identifying information, the hash values of the wireless terminal identifying information, and the extended conditions for print authentication in the access right information 91 are extracted by the access right information managing unit 31 from the transmission data transmitted from the PC 200, and stored as individual data items.

Thus, in the access right managing server 300, the document to be printed, the wireless terminal 400 for print authentication, and the extended conditions for print authentication can be set in advance in association with one another.

As described above, in the print control system 1 according to the present embodiment, the access right information 91 is generated and managed by the individual functional units of the PC 200 and the access right managing server 300.

In the following, the print permission determining unit 13 of the image forming apparatus 100 is described. The other functional units of the image forming apparatus 100 are similar to those of Embodiment 1, and therefore their description is omitted.

The print permission determining unit 13 determines whether printing should be permitted or not based on the wireless terminal identifying information acquired from the wireless terminal 400 ("detected wireless terminal identifying information") and the wireless terminal identifying information extracted from the access right information 91 ("stored wireless terminal identifying information"). The print permission determining unit 13 also considers the extended conditions for print authentication that have been acquired from the access right information 91.

Thus, the print control function according to the present embodiment is realized by the above-described individual functional units as they cooperate with one another.

In the following, the operation of the print control function (i.e., cooperation of the individual functional units) is described in greater detail. A function of the print control system 1 may be realized by the CPU of the image forming apparatus 100, the PC 200, or the access right managing server 300 executing an installed program (software component), thereby performing the following processes. The operation of the print control system 1 and that of the PC 200 in the system are similar to Embodiment 1, and therefore their description is omitted, with the following description being concerned with the operation of the image forming apparatus 100 for a print permission determination.

<Operation of Image Forming Apparatus>

Figure 11:
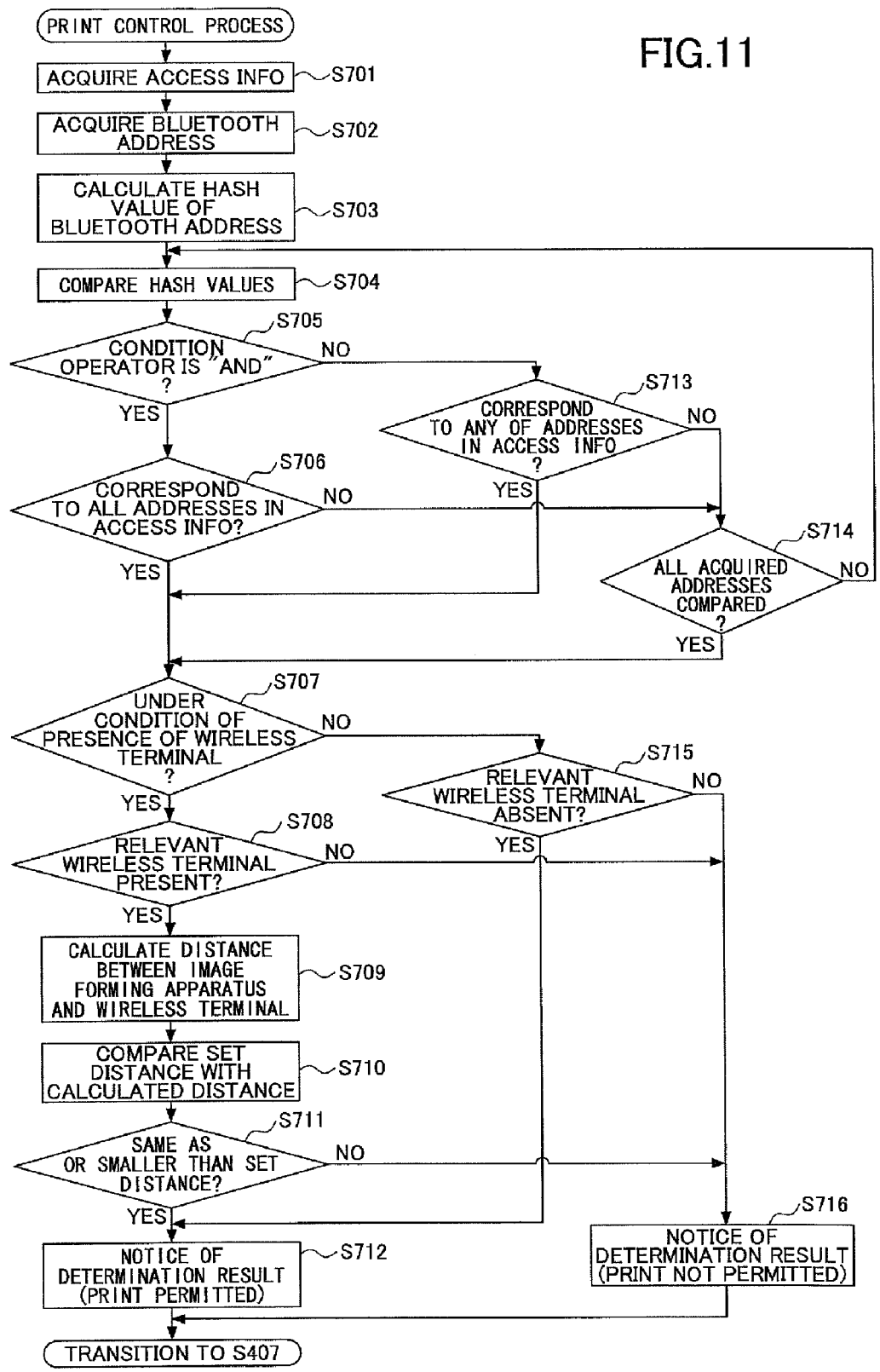
FIG. 11 shows a flowchart of a print control process according to the second embodiment.

FIG. 11 shows a flowchart of a print control process according to the present embodiment. As shown in FIG. 11, the access right information acquiring unit 11 acquires the access right information 91 from the access right managing server 300 (step S701).

The wireless terminal identifying information acquiring unit 12 then acquires the Bluetooth address from the wireless terminal 400 located near the image forming apparatus 100 (step S702).

Thereafter, the print permission determining unit 13 calculates a hash value of the Bluetooth address acquired in step S702, using the hash function that the access right information generating unit 11 has used for encrypting the wireless terminal identifying information (step S703). When there are plural Bluetooth addresses acquired, the print permission determining unit 13 calculates the hash value for each of the addresses.

The print permission determining unit 13 then compares the calculated hash value with the hash value of the wireless terminal identifying information contained in the access right information 91 acquired in step S701 (step S704).

The print permission determining unit 13 then determines whether the condition operator as an extended condition included in the access right information 91 acquired in step S701 is "AND" (step S705).

When the condition operator is "AND" (YES in step S705), the print permission determining unit 13 determines whether the hash values of all of the wireless terminal identifying information items included in the access right information 91 correspond to the hash values calculated in step S703 (step S706).

On the other hand, when the condition operator is "OR" (NO in step S705), the print permission determining unit 13 determines whether the hash value of any one of the wireless terminal identifying information items included in the access right information 91 corresponds to the hash value calculated in step S703 (step S713).

If the result of determination is "No" in either step S706 or S713, the print permission determining unit 13 determines whether all of the addresses acquired in step S702 have been compared (step S714).

If not all of the acquired addresses have been compared (NO in step S714), the print permission determining unit 13 repeats the comparison of the hash value of the Bluetooth address that has not been compared with the hash value of the wireless terminal identifying information included in the access right information 91.

The print permission determining unit 13 then temporarily retains the determination result in step S706, S713, or S714, and then the routine proceeds to step S707 which is described later. The print permission determining unit 13 may retain the aforementioned determination result in terms of a flag consisting of a predetermined bit string. In step S706, such a flag may be indicated when the hash values of all of the wireless terminal identifying information items corresponded with the calculated hash values. In step S713, such a flag may be indicated when the hash value of any one of the wireless terminal identifying information items corresponded with the calculated hash value. In step S714, such a flag may be indicated when the comparison of all of the addresses acquired is complete.

Thereafter, the print permission determining unit 13 determines whether as an extended print permitting condition included in the access right information 91 acquired in step S701 indicates "PRESENT" (step S707).

When the extended print permitting condition indicates "PRESENT" (YES in step S707), the print permission determining unit 13, based on the temporarily retained determination result (flag), determines whether the corresponding wireless terminal 400 is present (step S708). If there is the wireless terminal 400 that is designated as the terminal for print authentication, printing is permitted.

On the other hand, when the print permitting condition is "ABSENT" (NO in step S707), the print permission determining unit 13 determines whether or not there is the corresponding wireless terminal 400, based on the determination result (flag) that has been temporarily retained (step S715). If there is no wireless terminal 400 that is designated as the terminal for print authentication, printing is permitted.

When it is determined that the corresponding wireless terminal 400 is present (YES in step S708), the print permission determining unit 13 calculates a communication distance between the image forming apparatus 100 and the corresponding wireless terminal 400 (step S709). In this step, the print permission determining unit 13 may calculate the distance information based on a radio intensity measurement such as the received signal strength indication (RSSI) or communication quality (link quality). For example, the print permission determining unit 13 transmits a predetermined information acquisition command to the wireless terminal 400 via the wireless communication control unit 16 and acquires the information about radio intensity or communication quality.

Theoretically, radio intensity is inversely proportional to distance, so that it can be learned that the greater the radio intensity, the nearer the wireless terminal is. Bit error rate increases proportionally to distance. In accordance with the present embodiment, these characteristics may be utilized to calculate the aforementioned distance information.

When radio intensity is utilized, the wireless communication control unit 16 may transmit an HCI (Host Controller Interface) command "HCI_Get_RSSI" to the wireless terminal 400. Thus, the wireless communication control unit 16 can acquire information about radio intensity from the wireless terminal 400, where the radio intensity information that can be acquired is in a range of −128 dB to 127 dB.

When communication quality is utilized, the wireless communication control unit 16 may transmit an HCI command "HCI_Get_Link_Quality" to the wireless terminal 400. Thus, the wireless communication control unit 16 can acquire information about communication quality from the wireless terminal 400, where the communication quality information that can be acquired is in a range between 0x00 and 0xFF (in hexadecimal). Normally, the communication quality information varies between 200 and 255 when converted into decimal form.

The information about radio intensity or communication quality thus acquired via the wireless communication control unit 16 is then converted by the print permission determining unit 13 into the unit of the communication distance condition that has been set as an extended condition for print authentication, thus calculating the distance information.

For example, when the communication distance condition as an extended condition for print authentication can be set in five levels of values, the acquired information about radio intensity or communication quality is converted into any of the five-level values. In the case of the aforementioned radio intensity, because the data range has 255 steps, a radio intensity may be converted into any of the five values, at every 51 thresholds. In the case of the communication quality, because the valid data range normally has 55 steps, the communication quality may be converted into any of the five values at every 11 thresholds. Because the information about radio intensity or communication quality varies from one vendor to another of the Bluetooth communication module, the steps of the level values need to be adjusted for each vendor.

The print permission determining unit 13 then compares the distance information (converted level value) calculated by any of the above methods with the communication distance condition in the access right information 91 acquired in step S701 (step S710).

Based on a result of the comparison, the print permission determining unit 13 determines whether the communication distance between the image forming apparatus 100 and the wireless terminal 400 is within the communication distance in the extended condition (step S711).

If the communication distance is within the condition (YES in step S711), the print permission determining unit 13 notifies the print control unit 14 about the print permission determination result "Permitted" (step S712).

On the other hand, if the communication distance is greater than the condition (NO in step S711), the print permission determining unit 13 notifies the print control unit 14 about the print permission determination result "Not permitted" (step S716).

If there is no corresponding wireless terminal 400 in step S708, or if there is the corresponding wireless terminal 400 in step S715, the routine proceeds to step S716.

<Summary>

Thus, in accordance with Embodiment 2, the image forming apparatus 100 communicates with the wireless terminal 400 and identifies who is near the image forming apparatus 100. The image forming apparatus 100 then determines whether printing of print data should be permitted or not, depending on the confirmed environment, in accordance with an extended access right that is set for the print data in advance. Thus, the image forming apparatus 100 performs print authentication using the wireless terminal 400 that is carried by one or more persons near the image forming apparatus 100.

Thus, the image forming apparatus 100 can implement a print restriction depending on the environment. The extended access right enables print authentication based on a combination of plural wireless terminals, rather than making a print permission determination based on the presence or absence of a single wireless terminal for print authentication. For example, a print restriction can be imposed so that printing is not permitted unless the presence of an employee of the same section or an immediate manager can be confirmed, in addition to the person who made the print request or a designated recipient. Thus, in the image forming apparatus 100 according to the present embodiment, the confidentiality of the printed information can be further enhanced.

Embodiment 3

The wireless terminal for print authentication may be designated by manually entering the wireless terminal identifying information via a predetermined tool and/or a browser. However, in this designation method, a user needs to know the wireless terminal identifying information about the wireless terminal to be designated. Even if there is provided a GUI (Graphic User Interface), such as a pull-down menu, for allowing the selection of a wireless terminal, the user needs to know who has which wireless terminal. Desirably, the user should be able to designate the wireless terminal for print authentication more easily and simply.

Thus, in accordance with the present embodiment, a print control function is provided enabling the designation of a wireless terminal for print authentication based on identifying information such as an employee name. In the following description of the print control function according to the present embodiment, technical elements or aspects similar or identical to those described above with reference to the foregoing embodiments are designated with similar reference signs and their description is omitted.

<System Configuration>

Figure 12:
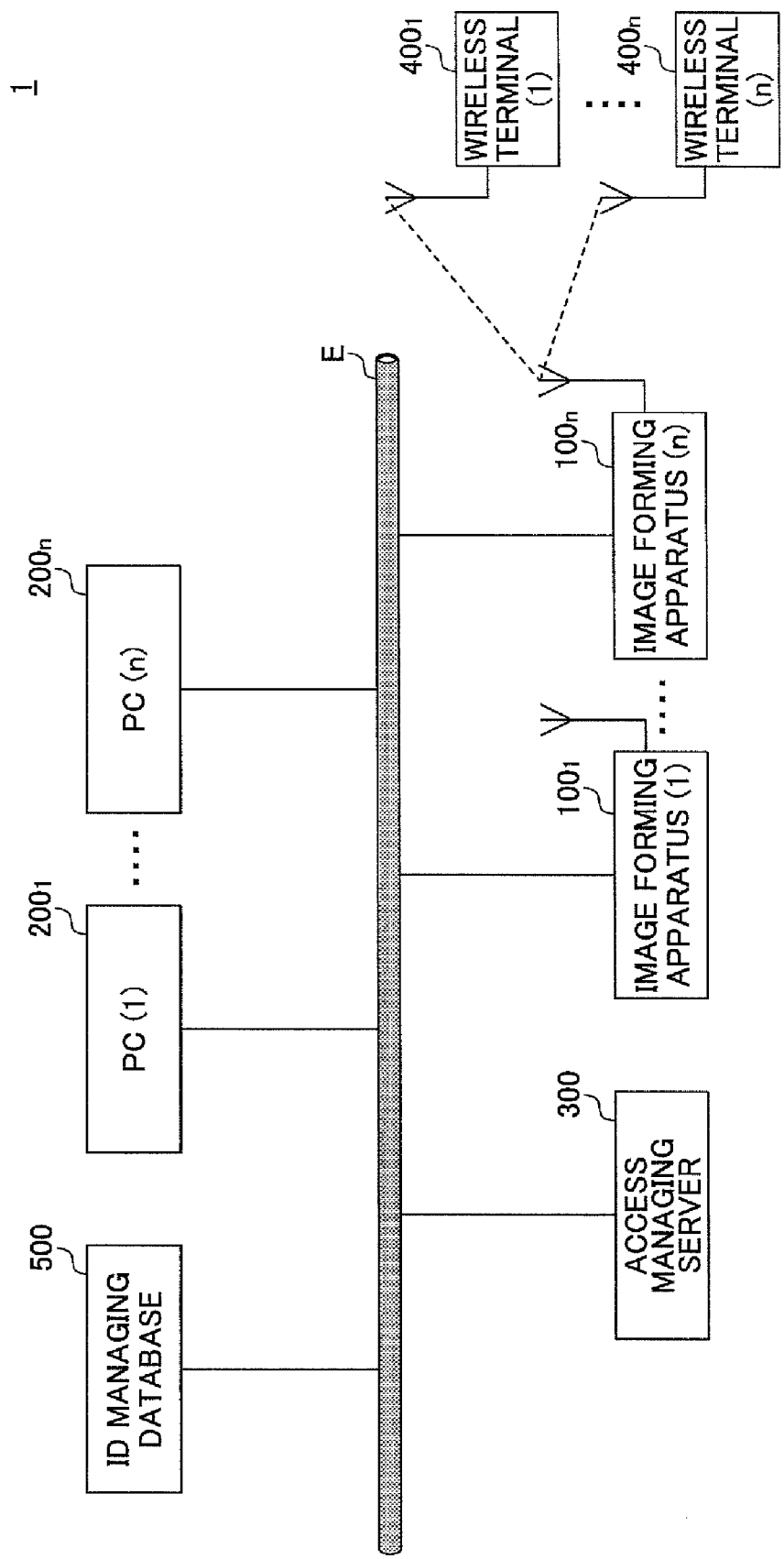
FIG. 12 shows a print control system according to a third embodiment of the present invention.

A system configuration according to the present embodiment is described. FIG. 12 shows a configuration of the print control system 1 according to Embodiment 3. As shown in FIG. 12, the print control system 1 includes an ID management database 500, in addition to the image forming apparatus 100, the PC 200, and the access right managing server 300, which are all connected to one another via the data transmission path E.

The ID management database 500 may include an LDAP (Lightweight Directory Access Protocol) server. LDAP is a protocol for providing access to a directory database in a TCP/IP network such as the Internet or an intranet. "Directory service" refers to a service for managing mail addresses of users who use the network or information about the network environment, where such information may be retrieved based on user name or the like. The ID management database 500 with such functions may be introduced into an office environment for centrally managing user information.

When the print control system 1 according to the present embodiment is introduced into an office environment, the following print control can be performed, for example. In the print control system 1, first an employee who possesses the wireless terminal 400 for print authentication in association with a document to be printed is designated from the PC 200. In response to an access right registration request from the PC 200, the access right managing server 300 accesses the ID management database 500. The access right managing server 300, based on the designated personal identifying information, acquires from the ID management database 500 corresponding wireless terminal identifying information, and registers the access right information 91.

Upon reception of a print request from the PC 200, the image forming apparatus 100 communicates with the wireless terminal 400 and imposes a print restriction based on the identity of the employee who carries the wireless terminal 400 near the image forming apparatus 100. Thus, in the print control system 1 according to the present embodiment, printing can be restricted depending on the environment of the image forming apparatus 100.

<Print Control Function>

Figure 13:
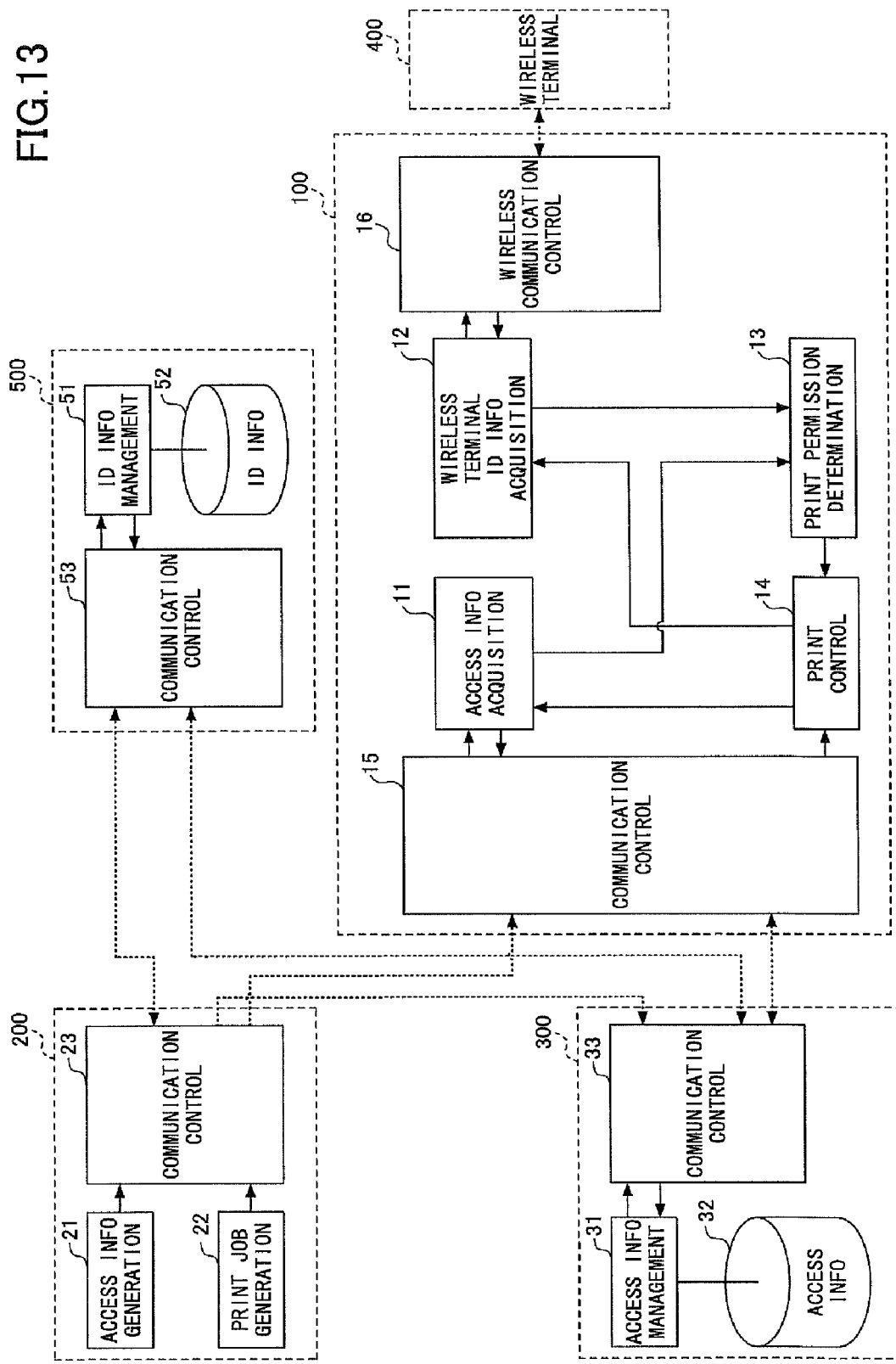
FIG. 13 shows a functional configuration of the print control system according to the third embodiment.

In the following, a print control function according to the present embodiment is described. FIG. 13 shows a functional configuration of the print control system 1 according to the present embodiment.

As described above, in the print control system 1 according to the present embodiment, the access right managing server 300, in response to an access right registration request from the PC 200, acquires corresponding wireless terminal identifying information from the ID management database 500 based on designated personal identifying information, and registers the access right information 91.

In the following, generation and management of the access right information 91 by the PC 200, the access right managing server 300, and the ID management database 500 are described with reference to FIGS. 14 through 16.

Figure 14:
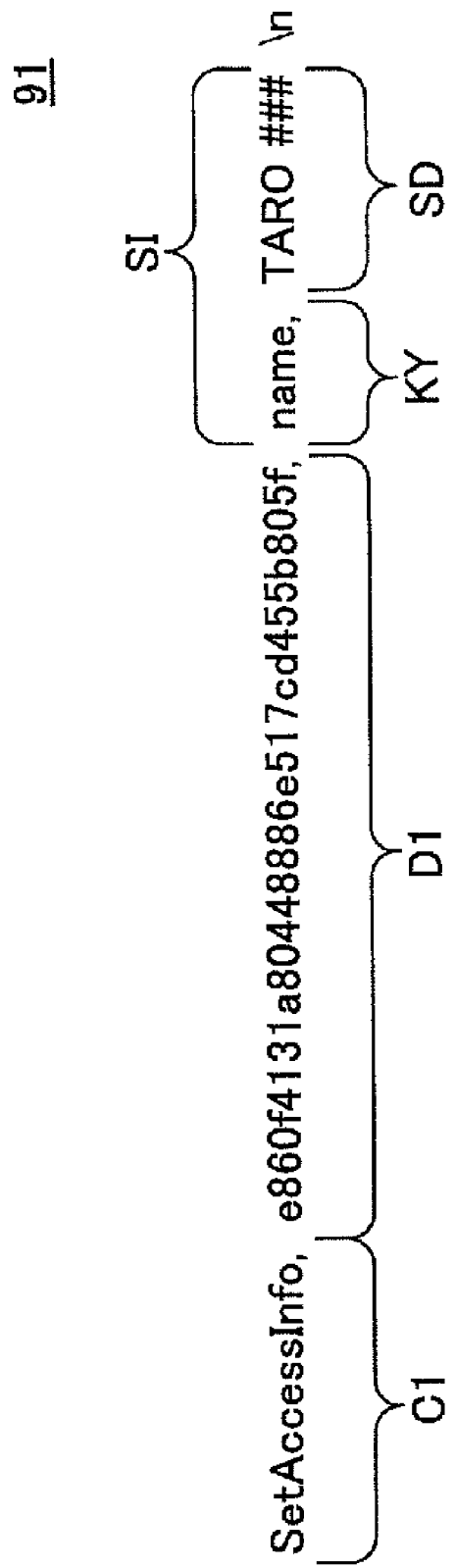
FIG. 14 shows an example of data in access right information according to the third embodiment.

FIG. 14 shows an example of data in the access right information 91 that is generated by the access right information generating unit 21 of the PC 200 as transmission data. The access right information generating unit 21 transmits the generated transmission data to the access right managing server 300 as the access right information 91, thereby making a registration request concerning the access right information 91.

The access right information generating unit 21 generates the transmission data based on document identifying information and personal identifying information. The personal identifying information may be obtained via a screen shown in FIG. 15.

Figure 15:
FIG. 15 shows a designated wireless terminal setting screen according to the third embodiment.

FIG. 15 shows an example of a designated wireless terminal setting screen. As shown in FIG. 15, the wireless terminal 400 for print authentication may be designated by setting a "designated kind" indicating the kind of data designating the wireless terminal 400, and a "terminal designation" designating the wireless terminal 400 in terms of the designated kind. In the screen example shown in FIG. 15, the designated kind can be set in a text box, and the terminal designation can be set by selecting from a pull-down menu.

Thus, the access right information generating unit 21 generates the transmission data by associating a document to be printed that is designated by the user who makes a print request and a search key (terminal designation) identifying the wireless terminal 400 for print authentication.

The transmission data mainly consists of a process request command and process target data. Specifically, the transmission data shown in FIG. 14 includes three items of data C1, D1, and SI. C1 designates a command requesting the registration of the access right information 91. D1 designates document identifying information generated. SI designates a search condition specifying the wireless terminal 400 for print authentication.

The search condition SI includes process target data KY and SD. The process target data KY indicates the kind of search key (designated kind). The process target data SD indicates a search key (terminal designation). In the transmission data shown in FIG. 14, the search condition items are "name" (search key kind) and "Taro ###" (search key).

Thus, in the print control system 1 according to the present embodiment, the wireless terminal 400 for print authentication can be designated by personal identifying information that is commonly used on daily basis.

On the other hand, management of the access right information 91 is handled by the access right managing server 300. In the access right managing server 300, the access right information managing unit 31 performs various data operations, such as registering, reading, or deleting data in order to manage the access right information 91. For example, the access right information managing unit 31 converts designated personal identifying information into information identifying the corresponding wireless terminal 400.

Specifically, the access right information managing unit 31, in response to a registration request concerning the access right information 91 from the PC 200, accesses the ID management database 500 and identifies the corresponding wireless terminal 400 therein, based on the personal identifying information included in the received data as a search condition. The access right information managing unit 31 thus acquires the wireless terminal identifying information.

The ID management database 500 includes an ID information managing unit 51 and an ID information retaining unit 52.

FIG. 16A shows an example of data in ID information 81. The ID information managing unit 51 is a functional unit for managing the ID information 81 by performing various data operations, such as registering, reading, or deleting data. For example, the ID information managing unit 51, upon reception of an acquisition request from the access right managing server 300 for the ID information 81, acquires the ID information 81 retained in the ID information retaining unit 52. The ID information managing unit 51 then determines a required data operation based on the process request command included in the received data, and processes the process target data contained in the received data accordingly.

The ID information retaining unit 52 is a functional unit for storing and retaining the ID information 81 in the data structure shown in FIG. 16A, for example. The ID information retaining unit 52 provides a nonvolatile storage unit (such as an HDD) for the ID management database 500.

The ID information 81 shown in FIG. 16A includes items for personal identification and wireless terminal identification, where the personal identifying information is associated with a hash value of the wireless terminal identifying information ("encrypted wireless terminal identifying information"). Thus, the ID information managing unit 51 can identify the wireless terminal 400 for print authentication based on the personal identifying information.

Thus, in the ID management database 500, information about the correspondence between individuals and their wireless terminals 400 is stored in advance.

The access right information managing unit 31 in the access right managing server 300 generates transmission data (request) as shown in FIG. 16B, for example, and transmits the data to the ID management database 500 that manages the ID information 81 in the above-described data structure, in order to acquire the wireless terminal identifying information about the wireless terminal 400 for print authentication.

The transmission data mainly consists of a process request command C3 and process target data SI. C3 indicates a command requesting the acquisition of wireless terminal identifying information. SI indicates search conditions.

The ID information managing unit 51 of the ID management database 500, based on the search conditions included in the transmission data (request) received from the access right managing server 300, acquires the corresponding wireless terminal identifying information by referring to the ID information 81 retained in the ID managing information retaining unit 52. For example, the ID information managing unit 51, upon reception of the transmission data shown in FIG. 16B from the access right managing server 300, first identifies the information item "name" based on the search key kind "name". Then, the ID information managing unit 51 searches for the search key "Taro ###" with respect to each data with the identified information item "name". As a result, the ID information managing unit 51 acquires the Bluetooth address "00:01:02:03:04:05" registered in the ID information 81 in association with "Taro ###".

The ID information managing unit 51 may then generate the transmission data shown in FIG. 16C and transmit it as a response to the information acquisition request from the access right managing server 300.

The transmission data (response) shown in FIG. 16C mainly consists of a process request command C4 and process target data RD. C4 indicates a command for responding to the information acquisition request. RD indicates the information (response information) acquired in accordance with the information acquisition request.

The access right information managing unit 31 in the access right managing server 300 thus acquires the wireless terminal identifying information (FIG. 16C) about the wireless terminal 400 for print authentication in response to the information acquisition request (FIG. 16B). The access right information managing unit 31, based on the wireless terminal identifying information acquired and the document identifying information in the access right information 91 from the PC 200, registers the access right information 91 by storing it in the access right information retaining unit 32.

The access right information managing unit 31 then determines a required data operation from the process request command included in the data received from the PC 200, and processes the process target data contained in the received data accordingly. The access right information managing unit 31, using a predetermined hash function, calculates a hash value of the wireless terminal identifying information acquired from the ID management database 500 (thus encrypting the wireless terminal identifying information), and stores the calculated value as a wireless terminal identifying data item.

Thus, in the access right managing server 300, the document to be printed and the wireless terminal 400 for print authentication can be set in advance in association with one another.

The communications (i.e., transmission and reception of various information) between the ID management database 500, the PC 200, and the access right managing server 300 are carried out by the communication control units 23, 33, and 53 in the respective units.

Thus, in the print control system 1 according to the present embodiment, the access right information 91 can be generated and managed by the respective functional units of the PC 200, the access right managing server 300, and the ID management database 500. The print control function according to the present embodiment is realized by the above-described individual functional units cooperating with one another.

Hereafter, a detailed operation (cooperation of the individual functional units) of the print control function is described. A function of the print control system 1 may be realized by the CPU of the image forming apparatus 100, the PC 200, the access right managing server 300, or the ID management database 500 executing an installed program (software component), performing processes described below. The operation of the image forming apparatus 100 and that of the PC 200 are similar to the foregoing embodiments and therefore their description is omitted. The operation of the print control system 1 for print restriction is also the same as in the foregoing embodiments, and therefore the description of the operation is omitted. Thus, the following description is concerned with only an operation for registering the access right information 91 in the print control system 1.

<System Operation>

Figure 17:
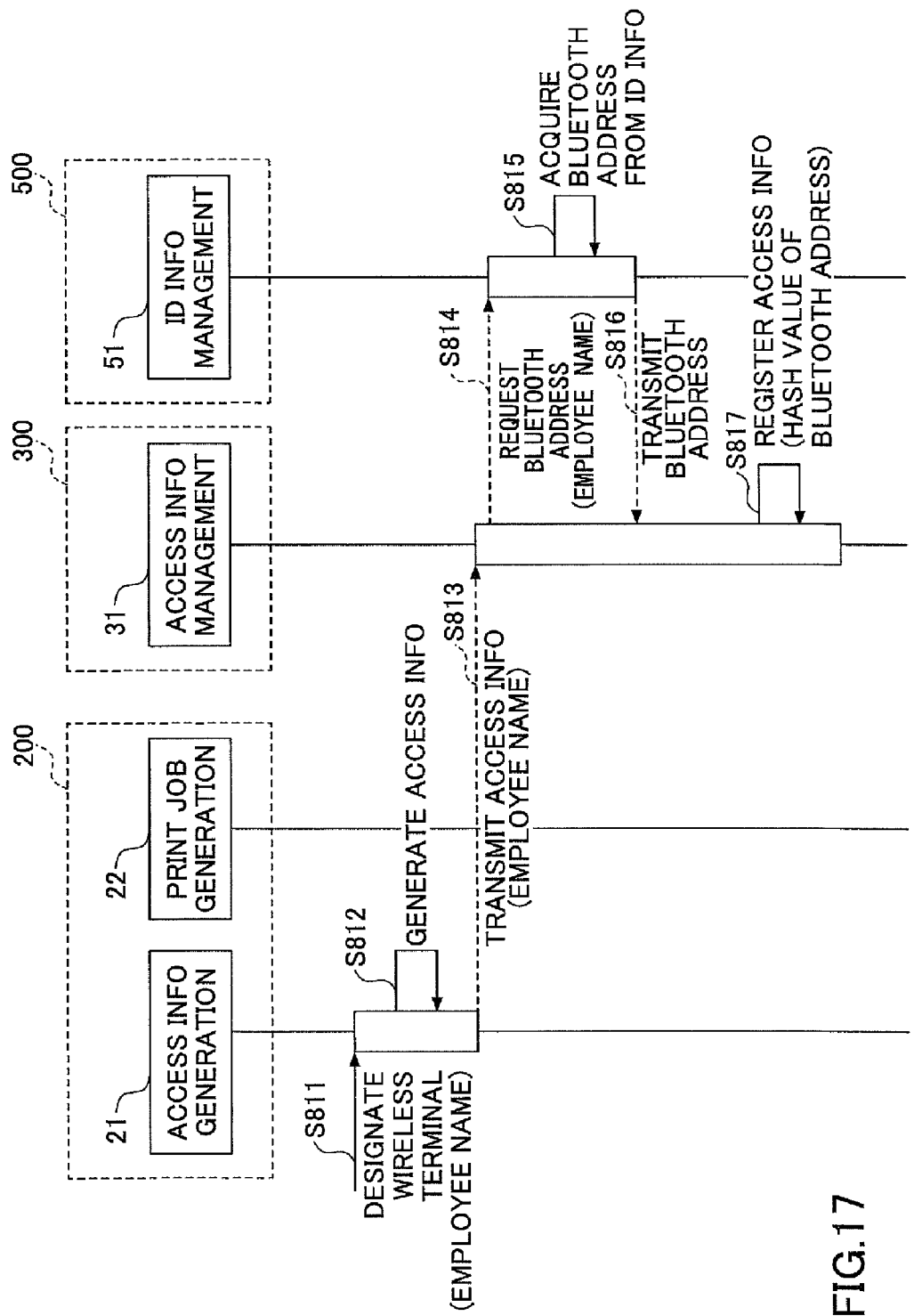
FIG. 17 shows a sequence diagram of a first process for registering access right information in the print control system according to the third embodiment.

FIG. 17 shows a sequence diagram of a first process of registering the access right information 91 in a print control according to the present embodiment. As shown in FIG. 17, in the print control system 1, first a document to be printed and a wireless terminal for print authentication are designated via the PC 200 (step S811). In this step, the wireless terminal is designated by setting the name of an employee in possession of the wireless terminal 400 as a search condition in the wireless terminal identifying information.

Then, in the PC 200, the access right information generating unit 21 generates, based on the designated document information and the search condition in the wireless terminal identifying information, the access right information 91 (transmission data) that is requested to be registered (step S812). The access right information generating unit 21 may generate the access right information 91 based on the UUID and the search condition "employee name".

The access right information generating unit 21 then transmits the generated access right information 91 to the access right managing server 300 (step S813), thereby requesting the registration of the access right.

The access right managing server 300, via the access right information managing unit 31, requests the acquisition of the Bluetooth address of the wireless terminal 400 for print authentication from the ID management database 500 (step S814). Specifically, the access right information managing unit 31 transmits to the ID management database 500 transmission data including a process request command requesting the acquisition of the Bluetooth address and the process target data "employee name" as the search condition in the registration request from the PC 200.

In the ID management database 500, the ID information managing unit 51 acquires the Bluetooth address that is registered in the ID information 81 (step S815), based on the search condition in the information acquisition request from the access right managing server 300. Specifically, the ID information managing unit 51, based on the search key kind "employee name" included in the search condition in the information acquisition request, identifies the information item "name" of the ID information 81 as a search target. Thereafter, the ID information managing unit 51 searches for the data corresponding to the identified information item "name" based on the search key, and acquires the Bluetooth address associated with the retrieved data.

The ID information managing unit 51 sends the thus acquired Bluetooth address back to the access right managing server 300 in response to the information acquisition request (step S816). Specifically, the ID information managing unit 51 transmits to the access right managing server 300 transmission data that includes a process request command for responding to the information acquisition request and the acquired process target data (Bluetooth address).

In the access right managing server 300, the access right information managing unit 31 stores the UUID and the Bluetooth address in association with one another in the access right information retaining unit 32, based on the access right information 91 received upon registration request and the response information received from the ID management database 500, thus registering the access right information 91 (step S817). Specifically, the access right information managing unit 31 calculates a hash value of the Bluetooth address in the response and registers the calculated value as a wireless terminal identifying data item of the access right information 91.

This completes the setting of the access right information 91 in the print control system 1, where the document to be printed and the wireless terminal 400 for print authentication are associated with one another.

Figure 18:
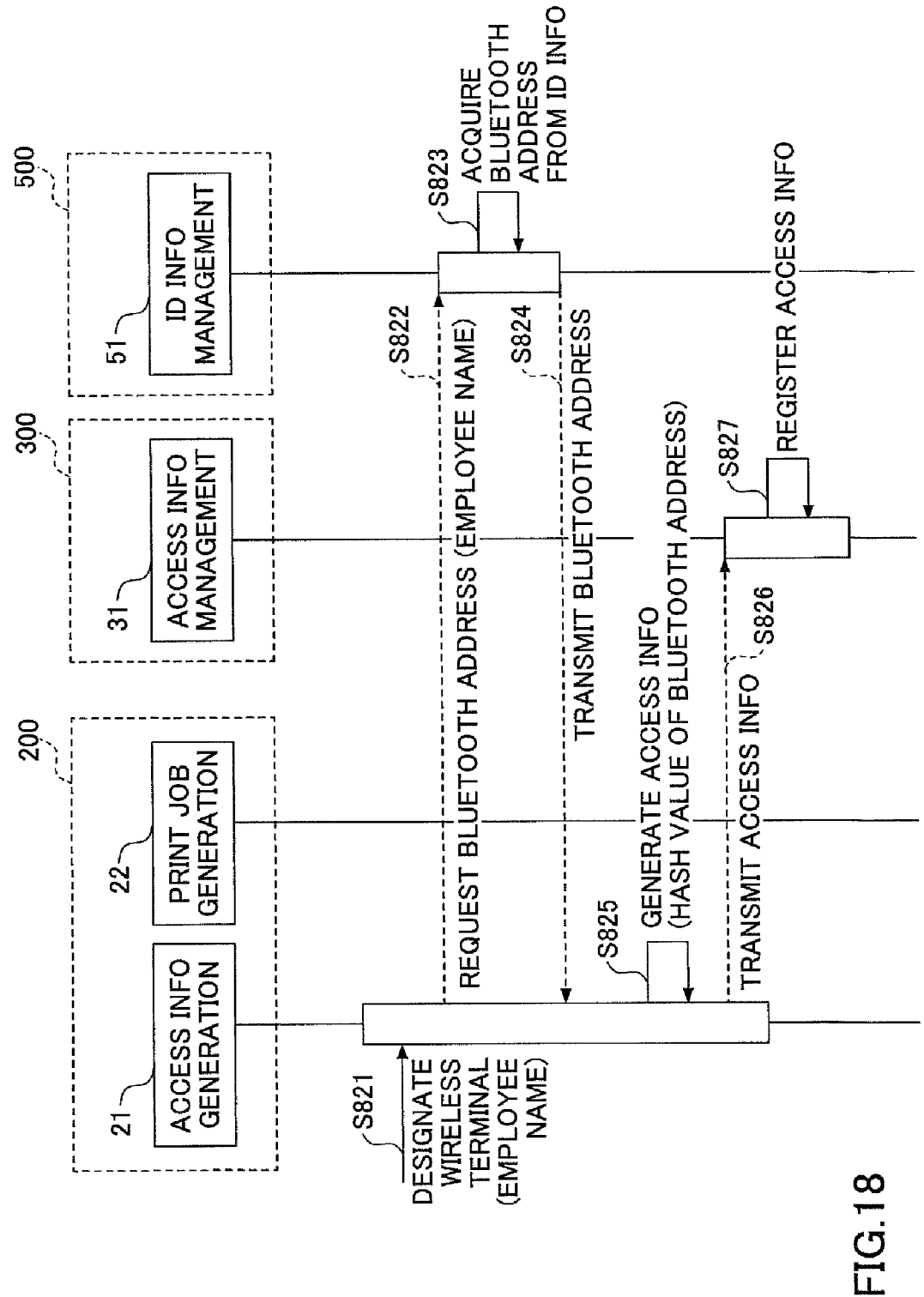
FIG. 18 shows a sequence diagram of a second process sequence for registering access right information in the print control system according to the third embodiment.

Alternatively, a process sequence shown in FIG. 18 may be used. FIG. 18 shows a sequence diagram of a second process for registering the access right information 91 by a print control according to the present embodiment. In the process sequence shown in FIG. 18, the access right information generating unit 21 of the PC 200 accesses the ID management database 500 and, based on the designated personal identifying information, acquires corresponding wireless terminal identifying information (steps S821 to S824). Then, the PC 200, via the access right information generating unit 21, generates the access right information 91 including a hash value of the wireless terminal identifying information, and sends the access right information 91 to the access right managing server 300, whereby the access right information 91 is registered (steps S825 to S827).

Thus, the PC 200 may send a request to the ID management database 500 to convert designated personal identifying information into the wireless terminal identifying information of the corresponding wireless terminal 400.

<Summary>

As described above, the image forming apparatus 100 according to Embodiment 3 communicates with the wireless terminal 400 for print authentication that is designated by identifying information, such as an employee name, and identifies the individual around the image forming apparatus 100. The image forming apparatus 100 then determines whether printing of print data should be permitted or not depending on the confirmed environment and in accordance with the access right that is set for the print data in advance. Thus, the image forming apparatus 100 conducts print authentication by using the wireless terminal 400 carried by the individual near the image forming apparatus 100.

Thus, in accordance with the present embodiment, because the wireless terminal 400 for print authentication can be designated with personal identifying information that is commonly used on a daily basis, the image forming apparatus 100 can implement a print restriction easily depending on the environment.

Embodiment 4

In accordance with Embodiment 4, a print control function is provided whereby the wireless terminal for print authentication can be designated based on information about an organizationally concerned party (hereafter referred to as "concerned party information"), in addition to the name of a employee who makes a print request as in Embodiment 3.

Hereafter, the print control function according to the present embodiment is described only with respect to technical elements or aspects different from those of the foregoing embodiments, with the corresponding or similar elements of aspects being designated with similar reference signs.

<System Configuration>

Figure 19:
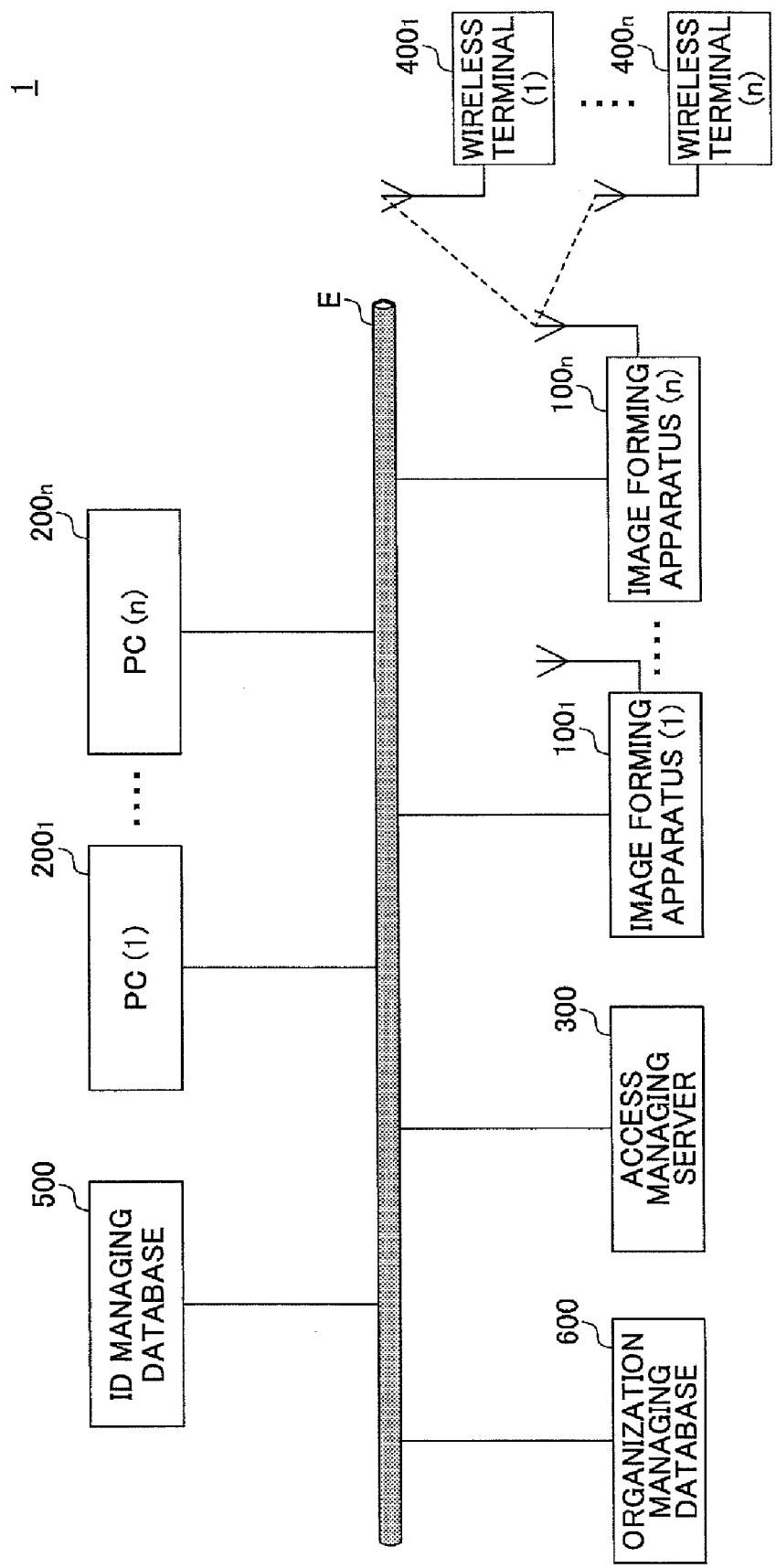
FIG. 19 shows a print control system according to a fourth embodiment of the present invention.

A system configuration according to the present embodiment is described. FIG. 19 shows a configuration of the print control system 1 according to the present embodiment. As shown in FIG. 19, the print control system 1 includes an organization management database 600, in addition to the image forming apparatus 100, the PC 200, the access right managing server 300, and the ID management database 500, which are mutually connected via the data transmission path E.

The organization management database 600 may include an LDAP server and may be introduced into an office environment for centrally managing organizational information in association with user information. When introduced into such an office environment, the print control system 1 performs the following print control, for example.

First, an employee in possession of the wireless terminal 400 that is used for print authentication in association with a document to be printed, and a concerned party who authenticates a printing operation by the employee are designated via the PC 200. In response to an access right registration request from the PC 200, the access right managing server 300 accesses the ID management database 500. The access right managing server 300, based on the designated employee and concerned party information, acquires from the ID management database 500 wireless terminal identifying information corresponding to the employee and the concerned party, and registers the access right information 91.

Thus, in the print control system 1, upon print request from the PC 200 to the image forming apparatus 100, the image forming apparatus 100 communicates with the wireless terminal 400 and implements a print restriction based on information about the employee and the concerned party that are identified near the image forming apparatus 100. In this way, printing can be limited depending on the environment of the image forming apparatus 100.

<Print Control Function>

Figure 20:
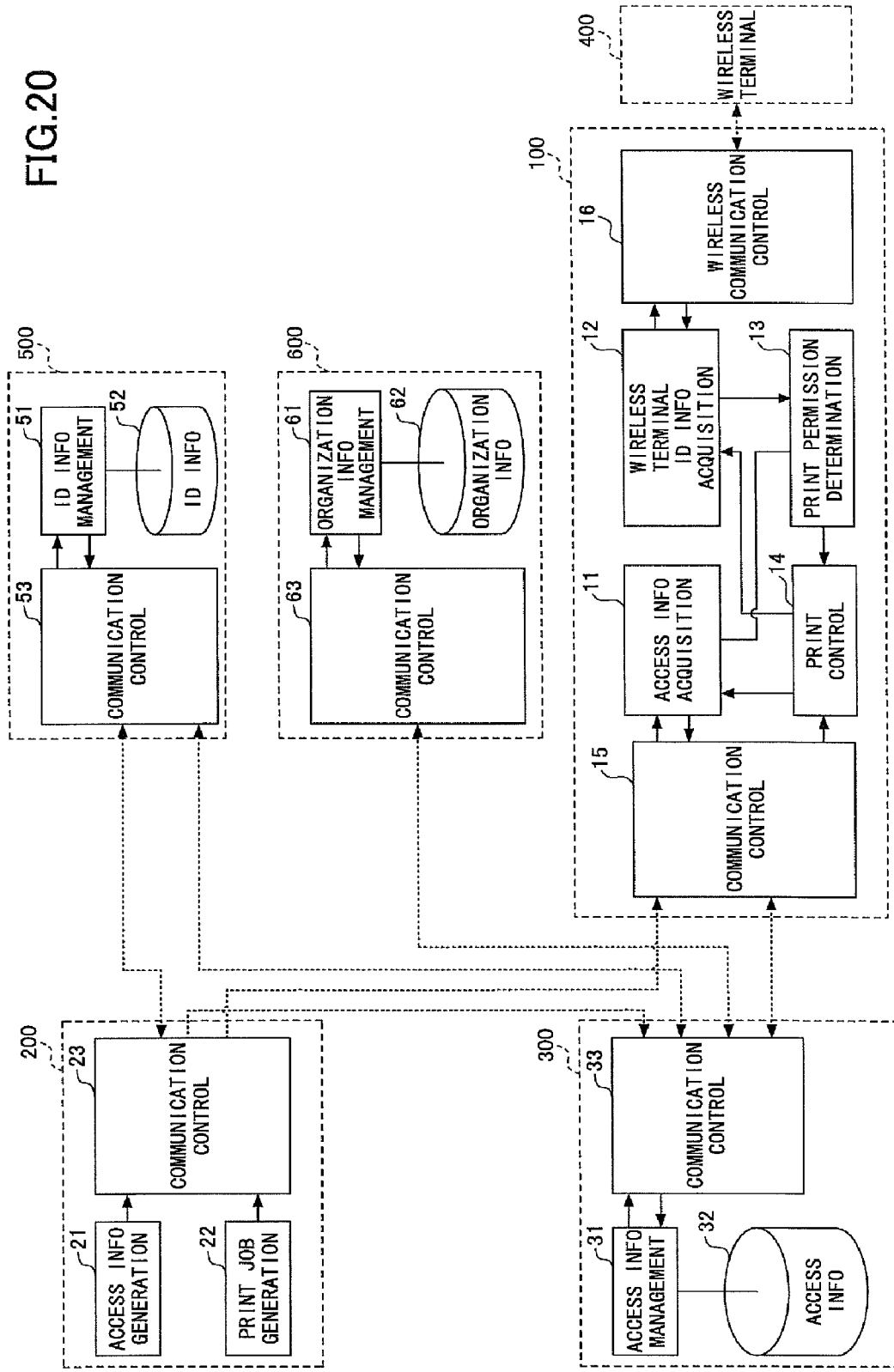
FIG. 20 shows a functional configuration of the print control system according to the fourth embodiment.

Hereafter, a print control function according to the present embodiment is described. FIG. 20 shows a functional configuration of the print control system 1 according to the present embodiment, which differs from the foregoing embodiments in that there is provided the organization management database 600.

As mentioned above, in the print control system 1 according to the present embodiment, the access right managing server 300, in response to an access right registration request from the PC 200, acquires from the ID management database 500 wireless terminal identifying information corresponding to a designated employee and a concerned party, and then registers the access right information 91.

Hereafter, the generation and management of the access right information 91 by the PC 200, the access right managing server 300, the ID management database 500, and the organization management database 600 are described with reference to FIGS. 21 to 23.

The access right information generating unit 21 in the PC 200 generates, as the access right information 91, transmission data including a process request command and process target data, and transmits the transmission data to the access right managing server 300, thereby requesting the registration of the access right information 91.

Specifically, the access right information generating unit 21, based on the document identifying information, personal identifying information about the employee, and the concerned party information, generates the aforementioned transmission data. The concerned party information may be obtained via a screen shown in FIG. 21. FIG. 21 shows an extended access right information setting screen according to the present embodiment.

Figure 21:
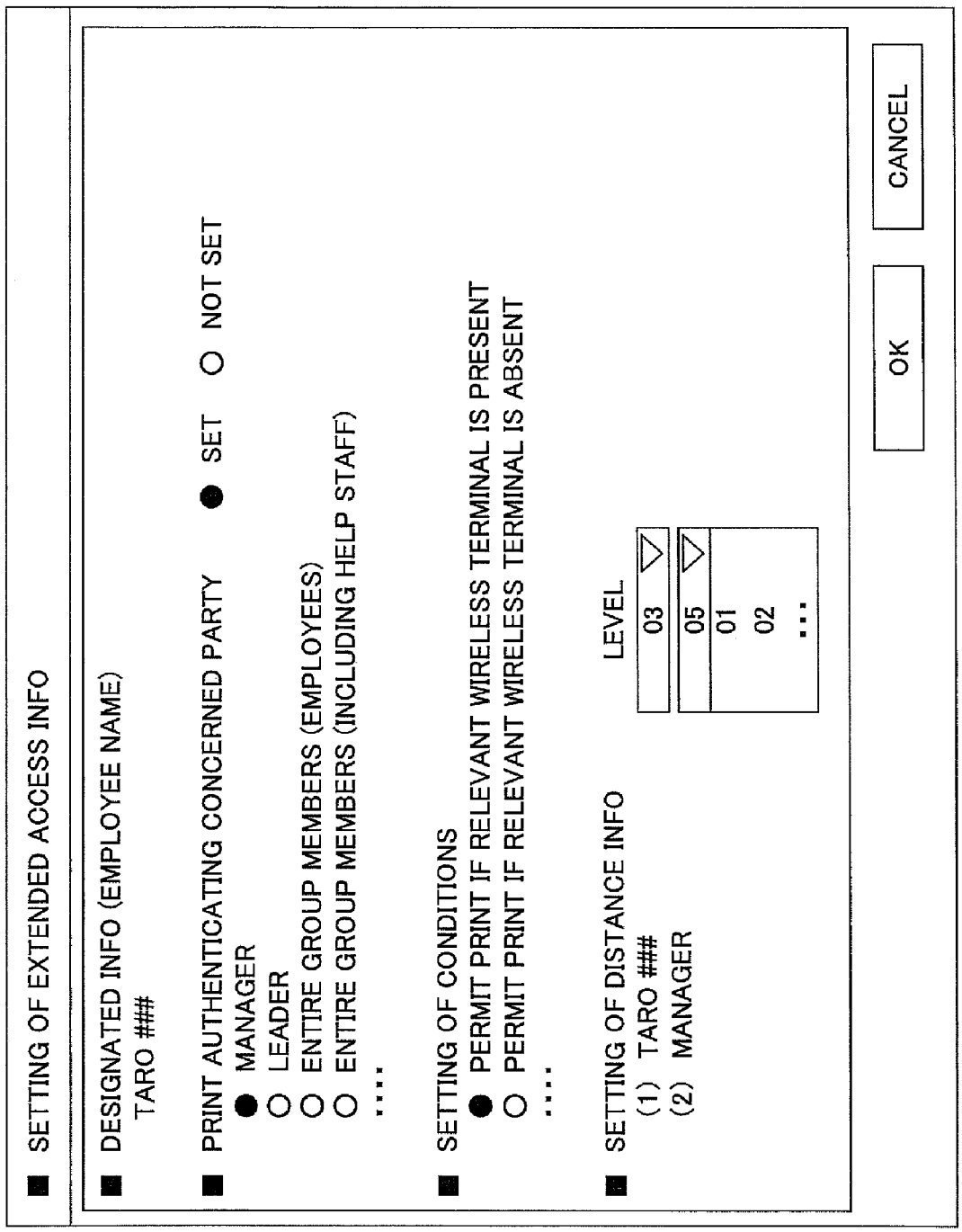
FIG. 21 shows an extended access right information setting screen according to the fourth embodiment.

As shown in FIG. 21, the concerned party information can be set in the same setting screen for setting print conditions such as a permitting condition and a distance condition, by indicating whether a concerned party should be designated or not, and by indicating an organizational relationship of the concerned party with the particular employee. In the screen example shown in FIG. 21, the presence or absence of the concerned party and the organizational relationship may be designated by radio buttons.

Thus, the access right information generating unit 21 generates the transmission data by associating a document to be printed that is designated by the user who makes a print request with a search key specifying the wireless terminal 400 for print authentication. Thus, in the print control system 1 according to the present embodiment, the wireless terminal 400 for print authentication can be designated by the personal identifying information about the print-requesting employee and the concerned party information.

The access right information 91 is managed by the access right managing server 300. Specifically, the access right information managing unit 31 in the access right managing server 300 manages the access right information 91 by performing various data operations, such as registering, reading, and deleting data.

The access right information managing unit 31 converts the personal identifying information about the designated employee into corresponding employee identifying information. Specifically, the access right information managing unit 31, in response to an access right information registration request via the transmission of the access right information 91 from the PC 200, accesses the ID management database 500. The access right information managing unit 31, based on the personal identifying information as a search key in the received data as a search condition identifying the wireless terminal 400 for print authentication, acquires from the ID management database 500 the corresponding employee identifying information.

Figure 22A:
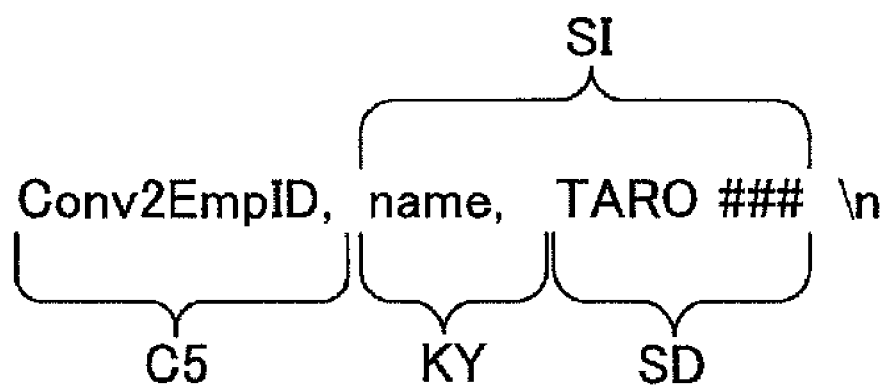
FIGS. 22A and 22B show examples of data in ID information according to the fourth embodiment.

The access right information managing unit 31 in the access right managing server 300 may generate data shown in FIG. 22A as the transmission data that is transmitted to the ID management database 500, in which the ID information 81 is managed as shown in FIG. 16, in order to acquire the employee identifying information.

The transmission data shown in FIG. 22A mainly consists of a process request command C5 and process target data SI. C5 indicates a command requesting the acquisition of employee identifying information. SI indicates search conditions included in the data received from the access right managing server 300.

The ID information managing unit 51 in the ID management database 500, based on the search conditions included in the received data from the access right managing server 300, acquires the corresponding employee identifying information with reference to the ID information 81 retained in the ID management information retaining unit 52. For example, the ID information managing unit 51, upon reception of the transmission data shown in FIG. 22A, first identifies the information item "name" to be retrieved, based on "name" in the transmission data indicating the kind of the search key. Then, the ID information managing unit 51 searches for the search key "Taro ###" with respect to each data with the identified information item "name". The ID information managing unit 51 then acquires an employee ID "123456789" registered in the ID information 81 in association with "Taro ###".

Figure 22B:
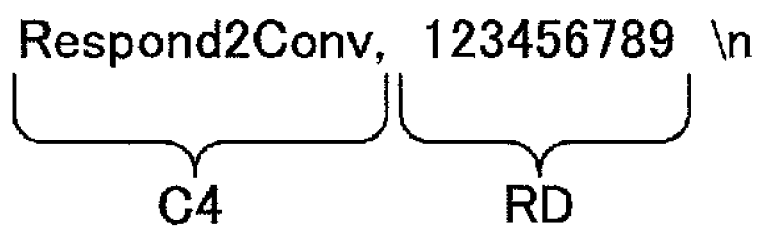

The ID information managing unit 51 then generates data as shown in FIG. 22B and transmit it to the access right managing server 300 as a response to the information acquisition request therefrom. The transmission data of FIG. 22B mainly consists of a process request command C4 and process target data RD. C4 indicates a command for responding to the information acquisition request. RD indicates information (response information) acquired in accordance with the information acquisition request.

Thereafter, the access right information managing unit 31 converts the designated concerned party information into corresponding employee identifying information. Specifically, the access right information managing unit 31 accesses the organization management database 600. The access right information managing unit 31, based on the concerned party information as a search key that is included in the received data as a search condition identifying the wireless terminal 400 for print authentication, acquires from the organization management database 600 corresponding employee identifying information.

Figures 23A, 23B, 23C:
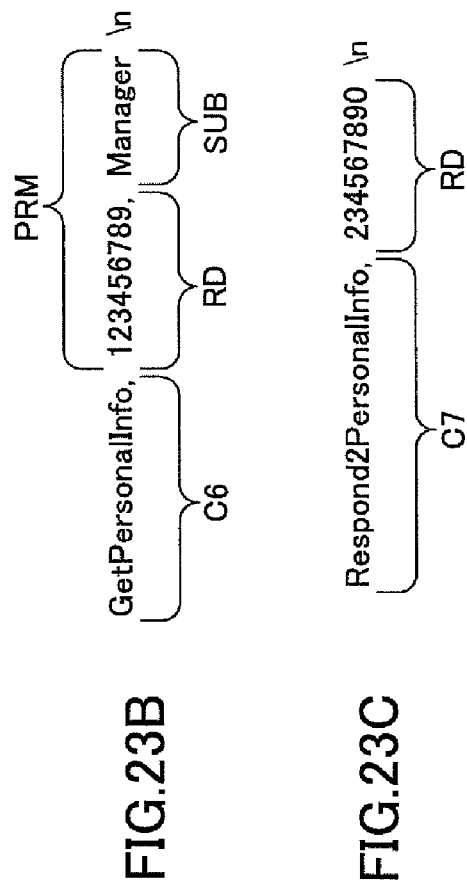
FIG. 23A shows a data format in which organizational information is stored in an organization management database according to the fourth embodiment.
FIG. 23B shows transmission data in a request for concerned party identifying information from the organization management database.
FIG. 23C shows transmission data in a response from the organization management database.

The organization management database 600 includes an organizational information managing unit 61 and an organizational information retaining unit 62. FIG. 23A show an example of data in organizational information 71.

The organizational information managing unit 61 is a functional unit for managing the organizational information 71 by performing various data operations, such as registering, reading, or deleting data. For example, the organizational information managing unit 61, upon reception of an organizational information acquisition request from the access right managing server 300, acquires the organizational information 71 retained by the organizational information retaining unit 62. The organizational information managing unit 61 then determines a requested data operation based on the process request command included in the received data, and processes the process target data contained in the received data accordingly.

The organizational information retaining unit 62 is a functional unit for storing and retaining the organizational information 71 in the data structure as shown in FIG. 23A, for example. The organizational information retaining unit 62 provides a nonvolatile storage unit (such as an HDD) for the organization management database 600.

The organizational information 71 shown in FIG. 23A includes items for identifying each employee and concerned party, where the employee identifying information and the concerned party information are associated with one another. Thus, the organizational information managing unit 61 can identify a concerned party who authenticates a printing process request by an employee, based on the employee identifying information.

In this way, an employee and his or her organizationally concerned party can be set in the organization management database 600 in advance in association with one another.

The access right information managing unit 31 of the access right managing server 300 may generate data shown in FIG. 23B as the transmission data that is transmitted to the organization management database 600.

The transmission data mainly consists of a process request command C6 and process target data PRM. C6 indicates a command requesting the acquisition of concerned party identifying information. PRM indicates search conditions for identifying the concerned party from the organizational information 71.

The search conditions PRM include two items of data, namely RD and SUB. The process target data RD indicates the employee identifying information that has been previously acquired. The process target data SUB indicates an organizational relationship designation contained in the data received from the PC 200. In the transmission data shown in FIG. 23B, the acquired employee identifying information is "123456789", and the organizational relationship designated is "Manager".

The organizational information managing unit 61 in the organization management database 600, based on the search conditions included in the data received from the access right managing server 300, acquires the relevant concerned party identifying information by referring to the organizational information 71 retained in the organization managing information retaining unit 62. For example, the organizational information managing unit 61, upon reception of the transmission data shown in FIG. 23B, first identifies the information item "employee identification" to be searched, based on the employee identifying information "123456789". Then, the organizational information managing unit 61 searches for the search key "123456789" with respect to each data under the identified information item "employee identification". As a result, the organizational information managing unit 61 acquires the employee ID "234567890", which is the concerned party identifying information corresponding to the information item "manager" that is registered in the organizational information 71 in association with "123456789".

The organizational information managing unit 61 then generates transmission data shown in FIG. 23C, for example, and transmits it to the access right managing server 300 as a response to the information acquisition request therefrom.

The transmission data shown in FIG. 23C mainly consists of a process request command C7 and process target data RD. C7 indicates a command for responding to the concerned party identifying information acquisition request. RD indicates the concerned party identifying information (response information) acquired in accordance with the information acquisition request.

Thereafter, the access right information managing unit 31 in the access right managing server 300 converts the employee identifying information and concerned party identifying information that have been acquired into the wireless terminal identifying information about the respective wireless terminals 400. Specifically, the access right information managing unit 31 accesses the ID management database 500, and, based on the employee identifying information and the concerned party identifying information, identifies the respective wireless terminals 400 in the ID management database 500, thus acquiring the wireless terminal identifying information.

The access right information managing unit 31, based on the acquired wireless terminal identifying information and the document identifying information included in the data (access right information 91) received from the PC 200, stores and registers the access right information 91 in the access right information retaining unit 32. More specifically, the access right information managing unit 31 calculates a hash value of the wireless terminal identifying information acquired from the ID management database 500 using a predetermined hash function (thus encrypting the wireless terminal identifying information), and stores the calculated value as a wireless terminal identifying data item.

Thus, in the access right managing server 300, the document to be printed and the wireless terminal 400 for print authentication can be set in advance in association with one another.

The communications (i.e., transmission and reception of various information) between the organization management database 600, the PC 200, the access right managing server 300, and the ID management database 500 in the above processes are conducted via the communication control units 23, 33, 53, and 63 of the individual units.

Thus, in the print control system 1 according to the present embodiment, the access right information 91 can be generated and managed by the above-described functional units of the PC 200, the access right managing server 300, the ID management database 500, and the organization management database 600. The print control function according to the present embodiment is thus realized by a cooperation of the individual functional units.

Hereafter, a detailed operation of the print control function (cooperation of the functional units) is described. A function of the print control system 1 may be realized by the CPU of the image forming apparatus 100, the PC 200, the access right managing server 300, the ID management database 500, or the organization management database 600 executing an installed program (software component), thereby performing the following processes.

The operation of the image forming apparatus 100 and that of the PC 200 are similar to the foregoing embodiments and therefore their description is omitted. Also, the operation of the print control system 1 for print restriction is similar to the foregoing embodiments and therefore the relevant description is omitted hereunder. Thus, the following description is only concerned with an operation for registering the access right information 91 in the print control system 1.

<System Operation>

Figure 24:
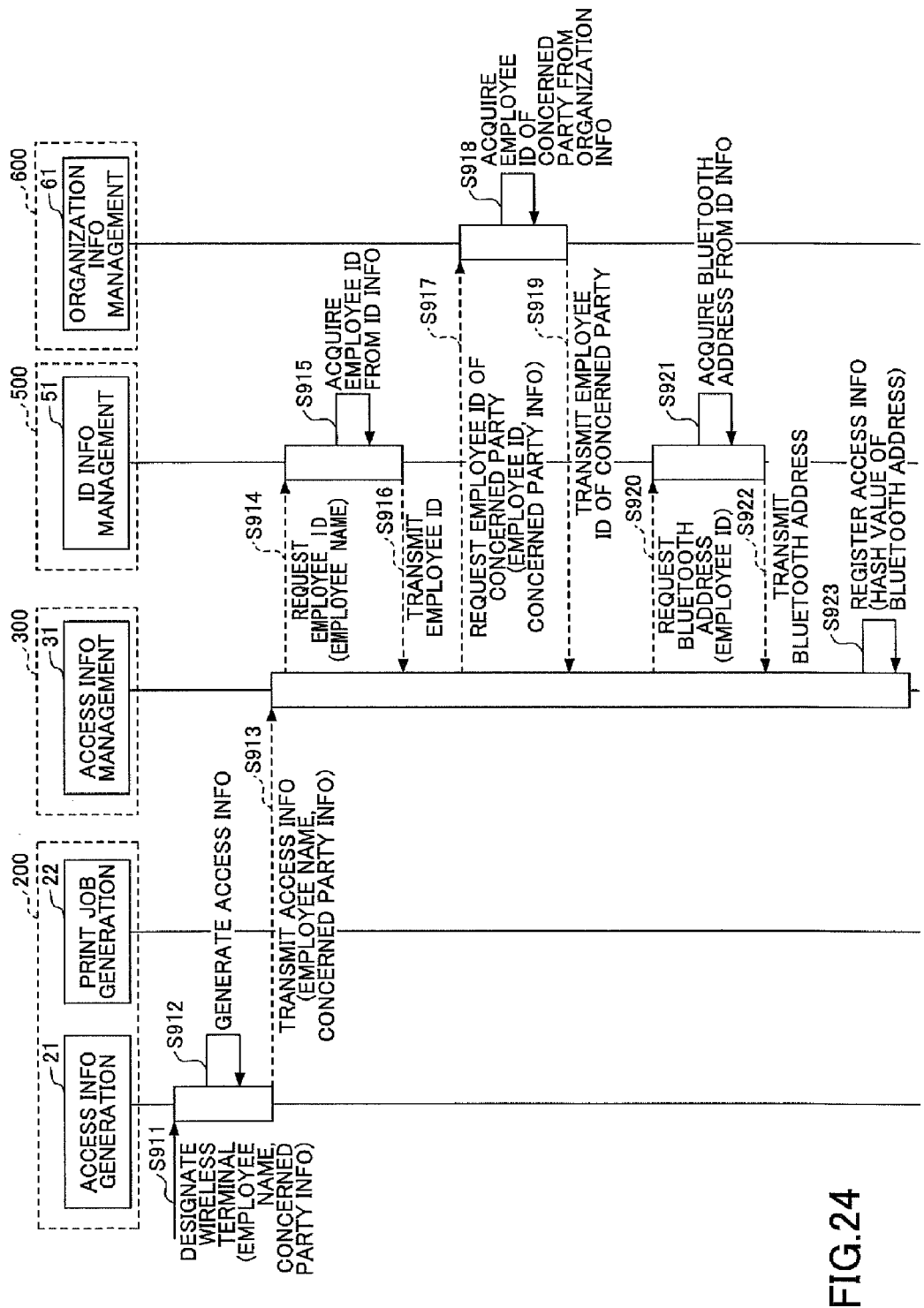
FIG. 24 shows a sequence diagram of a first process for registering access right information in the print control system according to the fourth embodiment.

FIG. 24 shows a sequence diagram of a first process sequence for registering the access right information 91 in a print control according to the present embodiment. As shown in FIG. 24, in the print control system 1, first a document to be printed, designations of the wireless terminals for print authentication, and various permitting conditions are received via the PC 200 (step S911). The designation of the wireless terminal may include a setting of a search condition for wireless terminal identifying information, such as an employee name identifying the person who is in possession of the wireless terminal 400, and concerned party information about a concerned party who authenticates a printing process by the employee.

In the PC 200, the access right information generating unit 21 generates, based on the document information about the designated document and the search conditions in the wireless terminal identifying information, the access right information 91 (transmission data) that is requested to be registered (step S912). Specifically, the access right information generating unit 21 generates the access right information 91 based on the UUID and the search conditions "employee name" and "concerned party information".

The access right information generating unit 21 then transmits the generated access right information 91 to the access right managing server 300 (step S913), thereby making an access right registration request.

In the access right managing server 300, the access right information managing unit 31 requests the acquisition of an employee ID of the employee who makes the print request and/or retrieves a printed output from the ID management database 500 (step S914). Specifically, the access right information managing unit 31 transmits to the ID management database 500 transmission data that includes a process request command requesting the acquisition of the employee ID and the process target data "employee name" as a search condition received upon registration request.

In the ID management database 500, the ID information managing unit 51 acquires the employee ID registered in ID information 81, based on the search condition received upon information acquisition request (step S915). Specifically, the ID information managing unit 51, based on the search key kind "employee name" included in the search conditions received upon information acquisition request, identifies the information item "name" to be searched in the ID information 81. Then, the ID information managing unit 51, based on the search key, searches for data corresponding to the identified information item "name" in order to acquire the employee ID corresponding to the data.

The ID information managing unit 51 transmits the employee ID acquired as described above to the access right managing server 300 from which the information acquisition request has been sent (step S916). Specifically, the ID information managing unit 51 transmits to the access right managing server 300 a process request command for responding to the information acquisition request and transmission data including the acquired process target data "employee ID".

Thereafter, in the access right managing server 300, the access right information managing unit 31 requests from the ID management database 500 the acquisition of an employee ID of the concerned party who authenticates the printing process by the employee (step S917). Specifically, the access right information managing unit 31 transmits to the ID management database 500 a process request command requesting the acquisition of the employee ID of the concerned party and transmission data including the process target data "employee ID" and "concerned party information", which are search conditions.

In the ID management database 500, the ID information managing unit 51, based on the search conditions received upon information acquisition request, acquires the employee ID of the concerned party registered in the ID information 71 (step S918). Specifically, the ID information managing unit 51, based on the employee ID received upon information acquisition request, identifies the information item "employee ID" to be searched in the ID information 81. The ID information managing unit 51 then searches the concerned party identifying items associated with the identified information item "employee ID" based on the search key "concerned party information", and acquires the employee ID of the concerned party.

The ID information managing unit 51 then transmits the employee ID of the concerned party thus acquired to the access right managing server 300 in response to the information acquisition request therefrom (step S919). Specifically, the ID information managing unit 51 transmits to the access right managing server 300 a process request command for responding to the information acquisition request and transmission data including the acquired process target data, i.e., the employee ID of the concerned party.

Then, the access right information managing unit 31 in the access right managing server 300 requests the acquisition of a Bluetooth address of the wireless terminal 400 for print authentication from the ID management database 500 (step S920). Specifically, the access right information managing unit 31 transmits to the ID management database 500 transmission data including a process request command requesting the acquisition of the Bluetooth address, and the process target data (including the employee ID of the concerned party) as a search condition.

In the ID management database 500, the ID information managing unit 51, based on the search conditions received upon information acquisition request, acquires the relevant Bluetooth address registered in the ID information 81 (step S921). Specifically, the ID information managing unit 51, based on the search key "employee ID" included in the search conditions received upon information acquisition request, searches for data corresponding to the information item "employee ID" and acquires the Bluetooth address associated with the relevant data.

The ID information managing unit 51 transmits the thus acquired Bluetooth address to the access right managing server 300 in response to the information acquisition request therefrom (step S922). Specifically, the ID information managing unit 51 transmits to the access right managing server 300 transmission data including a process request command for responding to the information acquisition request and the acquired process target data "Bluetooth address".

In the access right managing server 300, the access right information managing unit 31, based on the access right information 91 received upon registration request and the response information received from the ID management database 500, stores the UUID and the Bluetooth address in the access right information retaining unit 32 in association with one another, thus registering the access right information 91 (step S923). Specifically, the access right information managing unit 31 calculates a hash value of the Bluetooth address and registers the calculated value as the wireless terminal identifying item of the access right information 91.

Thus, in the print control system 1 according to the present embodiment, the setting of the access right information 91 is complete whereby the document to be printed and the wireless terminal 400 for print authentication are associated with one another.

Figure 25:
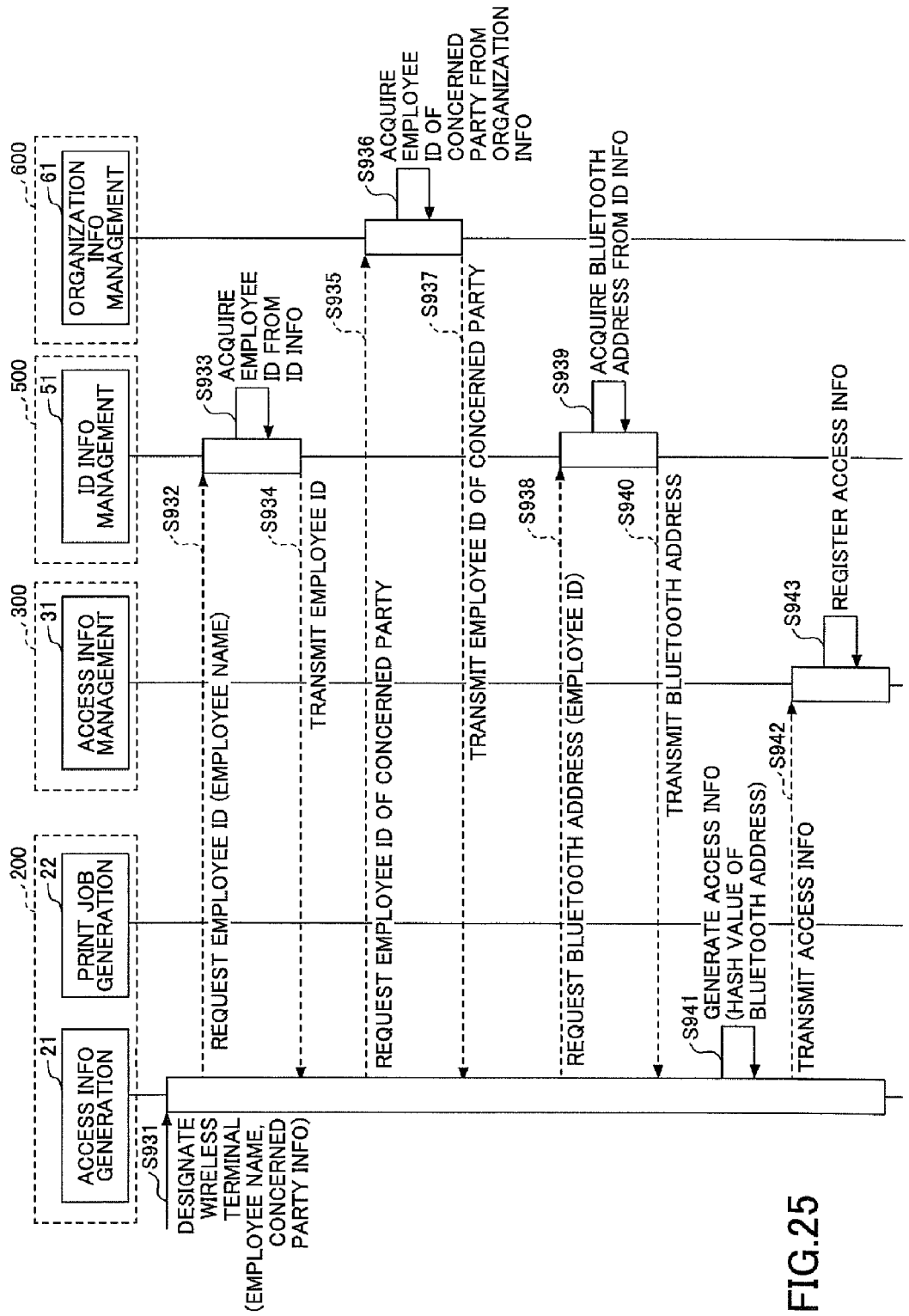
FIG. 25 shows a sequence diagram of a second process for registering access right information in the print control system according to the fourth embodiment.

Alternatively, a process sequence shown in FIG. 25 may be used. FIG. 25 shows a sequence diagram of a second process sequence for registering the access right information 91 in a print control according to the present embodiment. In the process sequence shown in FIG. 25, the access right information generating unit 21 in the PC 200 acquires employee identifying information from the ID management database 500 based on the personal identifying information about a designated employee. The access right information generating unit 21 also acquires, based on the concerned party information about a concerned party who authenticates a printing process by the designated employee, concerned party identifying information from the organization management database 600 (steps S931 to S937).

Thereafter, in the PC 200, the access right information generating unit 21, based on the employee identifying information and the concerned party identifying information that have been acquired, acquires the corresponding wireless terminal identifying information from the ID management database 500 (steps S938 to S940). Then, the access right information generating unit 21 generates the access right information 91 including the hash values of the wireless terminal identifying information, and sends a registration request to the access right managing server 300, whereby the access right information 91 is registered (steps S941 to S943).

Thus, the PC 200 may request the ID management database 500 to convert the acquired personal identifying information into the wireless terminal identifying information about the corresponding wireless terminals 400.

<Summary>

In accordance with Embodiment 4, the image forming apparatus 100 communicates with the wireless terminal 400 for print authentication that is designated by identifying information such as an employee name and/or an organizational concerned party, in order to identify one or more individuals near the image forming apparatus 100. The image forming apparatus 100 then determines whether printing of print data should be permitted or not depending on the confirmed environment in accordance with an access right that is set for the print data in advance. Thus, the image forming apparatus 100 conducts print authentication using the wireless terminals 400 carried by the individuals near the image forming apparatus 100.

In this way, the image forming apparatus 100 can implement a print restriction easily depending on the environment, as in Embodiment 3.

The print control function of the print control system 1 according to the present embodiment may be realized by the CPU in each unit of the system executing a print control program. Such a print control program may encode the process steps described above with reference to the drawings in a programming language adapted for the operating environment (platform) of each unit of the system. The program may be stored in the computer-readable recording media 114*a* and 203*a*.

The recording medium 114*a* may include an SD memory card and a USB memory. The recording medium 203*a* may include a flexible disc, a CD (Compact Disk), and a DVD (Digital Versatile Disk).

The print control program stored in the recording medium 114*a* may be read via the external storage I/F 114 and installed on the image forming apparatus 100 in the print control system 1. The print control program may also be downloaded via an electric communication line using the network I/F 113 of the image forming apparatus 100, and then installed. Similarly, a print control program may be read from the recording medium 203*a* via the drive unit 203 and then installed on the information processing unit 200, 300, 500, or 600 of the print control system 1. Alternatively, the print control program may be downloaded via an electric communication line and installed on the information processing units 200, 300, 500, or 600 using the interface unit 207 of each of the units.

While in the print control system 1 according to the foregoing embodiment the ID management database 500 and the organization management database 600 are provided by different devices, this is merely an example. In another embodiment, a single information processing unit (or external storage unit) may include the databases for ID management and organization management.

Although this invention has been described in detail with reference to certain embodiments, variations and modifications exist within the scope and spirit of the invention as described and defined in the following claims.

The present application is based on the Japanese Priority Applications No. 2008-191753 filed Jul. 25, 2008 and No. 2009-114814 filed May 11, 2009, the entire contents of which are hereby incorporated by reference.

What is claimed is:

1. An image forming apparatus for printing print data which is capable of communicating with a short-range wireless terminal for authenticating the print data with reference to access right information in which document identifying information identifying the print data is associated with wireless terminal identifying information identifying the short-range wireless terminal, the image forming apparatus comprising:
   an acquiring unit configured to acquire the wireless terminal identifying information from the short-range wireless terminal;
   a determining unit configured to determine whether the printing of the print data should be permitted or not based on the wireless terminal identifying information acquired by the acquiring unit and the access right information; and
   a control unit configured to control the printing of the print data depending on a result of the determination made by the determining unit.

2. The image forming apparatus according to claim 1, wherein the determining unit compares the wireless terminal identifying information acquired by the acquiring unit with the wireless terminal identifying information in the access right information and determines whether the printing of the print data should be permitted or not based on a result of the comparison.

3. The image forming apparatus according to claim 2, wherein the determining unit determines whether the printing of the print data should be permitted based on the result of the comparison in accordance with a print permitting condition that is set in the access right information in association with the document identifying information.

4. The image forming apparatus according to claim 3, wherein the determining unit permits the printing of the print data when the result of the comparison shows that the short-range wireless terminal is present near the image forming apparatus.

5. The image forming apparatus according to claim 3, wherein the determining until permits the printing of the print data when the result of the comparison shows that the short-range wireless terminal for print authentication is not present near the image forming apparatus.

6. The image forming apparatus according to claim 1, wherein, when a presence of the short-range wireless terminal is confirmed near the image forming apparatus, the determining unit determines whether the printing of the print data should be permitted or not in accordance with a communication distance condition that is set in the access right information in association with the wireless terminal identifying information.

7. The image forming apparatus according to claim 6, wherein the determining unit calculates a distance between the image forming apparatus and the short-range wireless terminal, and permits the print data when the calculated distance between the image forming apparatus and the short-range wireless terminal is equal to or smaller than a communication distance specified by the communication distance condition.

8. The image forming apparatus according to claim 1, wherein the access right information includes the wireless terminal identifying information about a plurality of the short-range wireless terminals,
  wherein the determining unit determines whether the printing of the print data should be permitted based on whether the wireless terminal identifying information acquired by the acquiring unit corresponds to the wireless terminal identifying information about all of the short-range wireless terminals set in the access right information, or whether the wireless terminal identifying information acquired by the acquiring unit corresponds to the wireless terminal identifying information about any one of the short-range wireless terminals set in the access right information.

9. A print control system comprising:
  an image forming apparatus for printing print data;
  a short-range wireless terminal for authenticating the print data; and
  an information processing apparatus for managing access right information in which document identifying information identifying the print data is associated with wireless terminal identifying information identifying the short-range wireless terminal,
  wherein the image forming apparatus, the short-range wireless terminal, and the information processing apparatus are connected via a data transmission path,
  the information processing apparatus including an information retaining unit configured to retain the access right information,
  wherein the image forming apparatus includes:
  a first acquiring unit configured to acquire the wireless terminal identifying information from the short-range wireless terminal;
  a second acquiring unit configured to send an information acquisition request to the information processing apparatus and configured to acquire the access right information from the information retaining unit;
  a determining unit configured to determine whether the printing of the print data should be permitted or not based on the wireless terminal identifying information acquired by the first acquiring unit and the access right information acquired by the second acquiring unit; and
  a control unit configured to control the printing of the print data in accordance with a result of the determination made by the determining unit.

10. The print control system according to claim 9, wherein the determining unit compares the wireless terminal identifying information acquired by the first acquiring unit with the wireless terminal identifying information in the access right information acquired by the second acquiring unit, and permits the printing of the print data when a result of the comparison shows that the short-range wireless terminal is present near the image forming apparatus, in accordance with a print permitting condition that is set in the access right information in association with the document identifying information.

11. The print control system according to claim 9, wherein the determining unit compares the wireless terminal identifying information acquired by the first acquiring unit with the wireless terminal identifying information in the access right information acquired by the second acquiring unit, and permits the printing of the print data when a result of the comparison shows that the short-range wireless terminal is not present near the image forming apparatus, in accordance with a print permitting condition that is set in the access right information in association with the document identifying information.

12. The print control system according to claim 9, wherein, when a presence of the short-range wireless terminal is confirmed near the image forming apparatus, the determining unit determines whether the print process should be permitted or not in accordance with a communication distance condition concerning a distance between the image forming apparatus and the short-range wireless terminal that is set in the access right information in association with the wireless terminal identifying information.

13. The print control system according to claim 12, wherein the determining unit determines that the print process should be permitted when a calculated distance between the image forming apparatus and the short-range wireless terminal is equal to or smaller than the communication distance specified by the communication distance condition.

14. A print control method for controlling printing of print data in a print control system including an image forming apparatus for printing the print data, a short-range wireless terminal for authenticating the print data, and an information processing apparatus for managing access right information in which document identifying information identifying the print data is associated with wireless terminal identifying information identifying the short-range wireless terminal, wherein the image forming apparatus, the short-range wireless terminal, and the information processing apparatus are connected via a data transmission path, the method comprising:
  sending the wireless terminal identifying information from the short-range wireless terminal to the image forming apparatus via the data transmission path;
  sending the access right information from the information processing apparatus to the image forming apparatus via the data transmission path;
  determining whether the printing of the print data by the image forming apparatus should be permitted or not based on the wireless terminal identifying information sent from the short-range wireless terminal and the access right information sent from the information processing apparatus; and
  controlling the printing of the print data in accordance with a result of the determination made in the determining step.

15. The print control method according to claim 14, wherein the determining step includes:
  comparing the wireless terminal identifying information sent from the short-range wireless terminal with the wireless terminal identifying information in the access right information sent from the information processing apparatus; and determining whether the printing of the print data should be permitted or not based on a result of the comparison in the comparing step.

16. The print control method according to claim 15, wherein the determining step determines whether the printing of the print data should be permitted or not in accordance with a print permitting condition that is set in the access right information in association with the document identifying information.

17. The print control method according to claim 16, wherein the determining step permits the printing of the print data when the result of the comparing step shows that the short-range wireless terminal is present near the image forming apparatus.

18. The print control method according to claim 16, wherein the determining step permits the printing of the print data when the result of the comparing step shows that the short-range wireless terminal is not present near the image forming apparatus.

19. The print control method according to claim 14, wherein, when a presence of the short-range wireless terminal is confirmed near the image forming apparatus, the determining step determines whether the printing of the print data should be permitted or not in accordance with a communication distance condition set in the access right information in association with the wireless terminal identifying information.

20. The print control method according to claim 19, further comprising calculating a distance between the image forming apparatus and the short-range wireless terminal,
wherein the determining step permits the printing of the print data when the calculated distance between the image forming apparatus and the short-range wireless terminal is equal to or smaller than a distance specified by the communication distance condition.

* * * * *